United States Patent
Riahi et al.

(10) Patent No.: US 9,648,167 B2
(45) Date of Patent: *May 9, 2017

(54) BACK OFFICE SERVICES OF AN INTELLIGENT AUTOMATED AGENT FOR A CONTACT CENTER

(71) Applicant: Genesys Telecommunications Laboratories, Inc., Daly City, CA (US)

(72) Inventors: Akbar Riahi, El Sobrante, CA (US); Herbert Willi Artur Ristock, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,342

(22) Filed: May 5, 2014

(65) Prior Publication Data
US 2014/0270146 A1  Sep. 18, 2014

Related U.S. Application Data

(63) Continuation of application No. 13/866,824, filed on Apr. 19, 2013, now Pat. No. 8,767,948.
(Continued)

(51) Int. Cl.
*H04M 3/00* (2006.01)
*H04M 5/00* (2006.01)
(Continued)

(52) U.S. Cl.
CPC ........ *H04M 3/5166* (2013.01); *G06N 99/005* (2013.01); *H04M 3/00* (2013.01);
(Continued)

(58) Field of Classification Search
CPC .. H04M 3/523; H04M 3/5232; H04M 3/5166; H04M 3/5183; H04M 3/493
(Continued)

(56) References Cited

U.S. PATENT DOCUMENTS 6,134,315 A * 10/2000 Galvin ............... H04M 3/4228
379/201.01
6,178,239 B1  1/2001 Kishinsky et al.
(Continued)

FOREIGN PATENT DOCUMENTS

EP  2973312 A4  3/2016
JP  2009175943  8/2009
(Continued)

OTHER PUBLICATIONS

International Search Report for PCT/US2014/029863, mailed on Aug. 22, 2014, 4 pages.
(Continued)

*Primary Examiner* — Oleg Asanbayev
(74) *Attorney, Agent, or Firm* — Lewis Roca Rothgerber Christie LLP

(57) ABSTRACT

A back office services of an intelligent automated agent for a contact center is provided. The back office services is configured to run on a processor coupled to a non-transitory storage device. The back office services includes: a customer profile module configured to access a profile of a customer from a customer profile database stored on the storage device, the profile of the customer including interaction data from interactions involving the customer and the contact center, and analysis results from analyzing the interaction data between the interactions involving the customer and the contact center; and a content analysis module configured to generate new analysis results by performing the analyzing of the interaction data between consecutive interactions of the interactions involving the customer and the contact center, and update the analysis results of the profile of the customer on the storage device to reflect the new analysis results.

12 Claims, 22 Drawing Sheets

Related U.S. Application Data

(60) Provisional application No. 61/801,323, filed on Mar. 15, 2013.

(51) Int. Cl.
    *H04M 3/51*     (2006.01)
    *G06N 99/00*    (2010.01)
    *H04M 3/493*    (2006.01)
    *H04M 3/523*    (2006.01)

(52) U.S. Cl.
    CPC ....... *H04M 3/4936* (2013.01); *H04M 3/5175* (2013.01); *H04M 3/5183* (2013.01); *H04M 3/5235* (2013.01); *H04M 5/00* (2013.01); H04M 2203/401 (2013.01)

(58) Field of Classification Search
    USPC .............. 379/265.01–265.14, 266.01–266.1
    See application file for complete search history.

(56) References Cited

U.S. PATENT DOCUMENTS

| | | | |
|---|---|---|---|
| 6,603,854 | B1 | 8/2003 | Judkins et al. |
| 6,718,551 | B1* | 4/2004 | Swix et al. ................ 725/32 |
| 7,065,188 | B1 | 6/2006 | Mei et al. |
| 7,536,002 | B1 | 5/2009 | Ma et al. |
| 7,606,718 | B2 | 10/2009 | Cloran |
| 8,054,964 | B2 | 11/2011 | Flockhart et al. |
| 8,200,527 | B1 | 6/2012 | Thompson et al. |
| 8,223,944 | B2 | 7/2012 | Cloran et al. |
| 8,369,495 | B1 | 2/2013 | Mallenahally Channakeshava |
| 8,473,423 | B2 | 6/2013 | Krishnakumar et al. |
| 8,484,031 | B1 | 7/2013 | Yeracaris et al. |
| 8,767,948 | B1 | 7/2014 | Riahi et al. |
| 9,386,152 | B2 | 7/2016 | Riahi et al. |
| 2002/0002460 | A1 | 1/2002 | Pertrushin |
| 2004/0249650 | A1 | 12/2004 | Freedman et al. |
| 2005/0135595 | A1 | 6/2005 | Bushey et al. |
| 2006/0179064 | A1 | 8/2006 | Paz et al. |
| 2007/0019801 | A1 | 1/2007 | Brenneman et al. |
| 2007/0036320 | A1* | 2/2007 | Mandalia ............. G06Q 10/109 379/210.01 |
| 2007/0071222 | A1* | 3/2007 | Flockhart et al. ....... 379/265.02 |
| 2007/0121824 | A1 | 5/2007 | Agapi et al. |
| 2007/0263838 | A1 | 11/2007 | Wiseman et al. |
| 2007/0265990 | A1 | 11/2007 | Sidhu et al. |
| 2007/0280460 | A1 | 12/2007 | Harris et al. |
| 2008/0033816 | A1* | 2/2008 | Miller .................... G06Q 30/02 705/14.18 |
| 2008/0046386 | A1 | 2/2008 | Pieraccinii et al. |
| 2008/0118051 | A1 | 5/2008 | Odinak et al. |
| 2008/0240376 | A1* | 10/2008 | Conway ............. H04M 3/5232 379/211.01 |
| 2009/0010419 | A1 | 1/2009 | Toebes et al. |
| 2010/0063815 | A1 | 3/2010 | Cloran et al. |
| 2010/0157851 | A1 | 6/2010 | Farah |
| 2010/0158210 | A1 | 6/2010 | Awad et al. |
| 2010/0205129 | A1 | 8/2010 | Aaron et al. |
| 2010/0272246 | A1 | 10/2010 | Malik et al. |
| 2010/0278318 | A1 | 11/2010 | Flockhart et al. |
| 2011/0002457 | A1 | 1/2011 | Sharma et al. |
| 2011/0230229 | A1 | 9/2011 | Das et al. |
| 2012/0059815 | A1 | 3/2012 | Friedlander et al. |
| 2012/0140905 | A1 | 6/2012 | Awad et al. |
| 2012/0284085 | A1 | 11/2012 | Walker et al. |
| 2013/0051547 | A1 | 2/2013 | Chavez |
| 2013/0163746 | A1* | 6/2013 | Wick et al. ............. 379/265.14 |
| 2013/0204667 | A1 | 8/2013 | Brown et al. |
| 2013/0232012 | A1 | 9/2013 | Yan et al. |
| 2014/0006218 | A1 | 1/2014 | Muthu |
| 2014/0089327 | A1 | 3/2014 | Pavlidis et al. |
| 2014/0220526 | A1 | 8/2014 | Sylves |
| 2014/0270108 | A1 | 9/2014 | Riahi et al. |
| 2014/0270109 | A1 | 9/2014 | Riahi et al. |
| 2014/0314225 | A1 | 10/2014 | Riahi et al. |
| 2017/0006161 | A9 | 1/2017 | Riahi et al. |

FOREIGN PATENT DOCUMENTS

| | | |
|---|---|---|
| JP | 2010212852 | 9/2010 |
| KR | 1020080048802 A | 6/2008 |
| KR | 1020090099924 A | 9/2009 |
| WO | 2014145149 A1 | 9/2014 |

OTHER PUBLICATIONS

Goldman, David; "Siri Is Your New Customer Service Rep"; CNN Money A Service of CNN, Fortune & Money; Aug. 16, 2012; 2 pages.

Unknown, Interactions Corporation—Business Model, 2013, retrieved from http://www.interactions.net/solutions/business-model/ on Aug. 21, 2013.

Unknown, Interactions Corporation—Company, 2013, retrieved from http://www.interactions.net/company/ on Aug. 21, 2013.

Müller, J.P., "The Design of Intelligent Agents—A Layered Approach", Springer, Second Printing, 1996, Table of Contents—p. 196.

Riahi, A. "Human Touch is the Key to Save the World from Bad Customer Service." @Genesys Product and Solution Strategy Team blog, published May 25, 2012, retrieved Jul. 22, 2013, 3 pages.

Unknown, Interactions Corporation—Virtual Assistant, 2013, retrieved from http://www.interactions.net/virtual-assistant/ on Aug. 21, 2013.

Unknown, Interactions Corporation—Solutions, 2013, retrieved from http://www.interactions.net/solutions/natural-language-technology/ on Aug. 21, 2013.

Unknown, Interactions Corporation—Natural Language Technology, 2013, retrieved from http://www.interactions.net/solutions/business-model/ on Aug. 21, 2013.

Kruger, A., Never again having to wait until the customer service staff is finally free to talk to you? German news article from ZDF with English Translation, dated Nov. 8, 2015, 4 pages.

International Preliminary Report on Patentability and Written Opinion of the International Searching Authority for PCT/US2014/029863, mailing date Sep. 24, 2015, 16 pages.

Supplementary European Search Report for Application No. 14762585.9, dated Feb. 22, 2016, 7 pages.

Australian Patent Examination Report No. 1 for Application No. 2014233357, dated Aug. 15, 2016, 6 pages.

Canadian Intellectual Property Office Action for Application No. 2,917,294, dated Jan. 4, 2017, 5 pages.

Korean Office Action with English Translation for Application No. 10-2015-7029613, dated Oct. 18, 2016, 18 pages.

European Patent Office Action for Application No. 147625859, dated Dec. 20, 2016, 8 pages.

* cited by examiner

Automated Customer Greeting Module    FIG. 15

BACK OFFICE SERVICES OF AN INTELLIGENT AUTOMATED AGENT FOR A CONTACT CENTER

CROSS-REFERENCE TO RELATED APPLICATION

This application is a continuation of U.S. patent application Ser. No. 13/866,824 filed Apr. 19, 2013, which claims the benefit of U.S. Provisional Application No. 61/801,323, filed on Mar. 15, 2013, entitled INTELLIGENT AUTOMATED AGENT FOR A CONTACT CENTER. This application is related to U.S. Non-Provisional application Ser. No. 13/866,763, filed on Apr. 19, 2013, entitled INTELLIGENT AUTOMATED AGENT FOR A CONTACT CENTER, U.S. Non-Provisional application Ser. No. 13/866,793, filed on Apr. 19, 2013, entitled INTELLIGENT AUTOMATED AGENT AND INTERACTIVE VOICE RESPONSE FOR A CONTACT CENTER, and U.S. Non-Provisional application Ser. No. 13/866,812, filed on Apr. 19, 2013, entitled CUSTOMER PORTAL OF AN INTELLIGENT AUTOMATED AGENT FOR A CONTACT CENTER. The entire content of all of the above are incorporated herein by reference.

FIELD

Aspects of embodiments of the present invention relate to a back office services of an intelligent automated agent for a contact center.

BACKGROUND

Customer contact centers handle large amounts of interaction between customers and one or more enterprises, such as companies or other organizations. For example, contact centers may provide centralized customer service and support functions. This interaction and customer service is often handled by contact center agents (live agents, for example, answering telephone calls, responding to e-mails, conducting live chats, making outbound calls, etc.) Contact centers may be very large, employing several hundred or even thousands of members in customer service, sales, and support functions. A single contact center may service many companies, for example, on an outsourced basis, allowing similar customer service work performed by the companies to be consolidated and run more efficiently.

Contact centers are often large offices staffed with representatives who either make or receive phone calls (such as with live agents), live chats, e-mails, etc. Depending on the size of the contact center, a single office could have less than a dozen representatives or more than 100 staff members (some contact centers have several thousand staff members). Some contact centers focus on answering inbound calls, such as a contact center for a bank that gives out a toll-free number for customers who need assistance. In this example, representatives may provide services such as giving account balances, answering questions about transactions, or taking loan applications over the phone. Other contact centers focus on outbound calls, such as contact centers for survey companies whose representatives make calls to ask people survey questions, or for telemarketing organizations, or for accounts receivable.

Live agents, however, have limitations, such as limited working hours, limited capacity (especially to conduct live assistance, e.g., may be limited to handling only one or a few customers at a time), limited knowledge levels or skill sets, etc., that make it impractical to guarantee, for example, that the same live agent is always available to assist a particular customer whenever that customer has a need to contact the contact center, or that the same answer is provided to different customers experiencing the same situation. Accordingly, customers using a contact center are often provided with inadequate, incorrect, or inconsistent information, frequently from a number of different live agents, and frequently with repeatedly having to provide the same underlying facts or circumstances to bring the latest live agent up to speed with the customer's situation.

As the cost of live agents may be significant, one method of improving the efficiency of the call center (while containing the cost of the live agents) is through techniques such as interactive voice response (IVR) technology, which can help offload some of the simpler tasks from live agents. With IVR, customer interactions are first broken down into a series of simple steps that may be delivered to a customer in an automated fashion, such as prerecorded scripts or multiple-choice menus on computer screens. This allows certain information (such as the nature of the problem, or an account number) to be obtained (for example, through a telephone keypad or a computer keyboard) before handing control over to a live agent.

Should, for example, the nature or complexity of the contact, or the customer request, an IVR interaction may need to be transferred (routed) to a live agent. For example, the IVR may pass control to a router, which may route the contact to a live agent (possibly based on information collected by the IVR script, such as to a live agent who specializes in the type of problem that the customer has selected from the choices provided). In addition, IVR may even handle simple calls for routine matters (such as a business' hours of operation) without engaging a live agent, so long as the customer's request falls into one of the choices of the simple menus of options provided.

IVR, however, does little to address the inherent limitations of live agents discussed above. In addition, customers tend to dislike IVR, whose impersonal approach requires a lot of repeating of information in both directions, frequently having to start from scratch, and often not reaching an acceptable solution. For example, customers find most IVR experiences unpleasant, usually because of being put on hold for an unreasonably long time (for example, waiting for a live agent), or having automated menus with too many options (and no one option really appropriate), and having to repeat the same information when trying to navigate the IVR menu in hopes of finding an acceptable path. In short, IVR is not a sufficient contact center solution for most customer concerns.

SUMMARY

Aspects of embodiments of the present invention are directed to an intelligent automated agent for a customer contact center. In one embodiment, the automated agent is an application running on a server computer. The automated agent may learn, for example, by artificial intelligence, to perform the roles of a live agent without the limitations of a live agent. In one exemplary embodiment, the automated agent responds to the customer in real time and in the same language (spoken or written) used by the customer. For example, the automated agent may have an artificial intelligence engine adapted to learn over time from its present interactions and use that knowledge to respond more appropriately to future interactions.

In one embodiment, the automated agent communicates across all of the channels (such as voice, e-mail, chat, web, mobile, smartphone, etc.) used by customers of the contact center. In one exemplary embodiment, the automated agent serves as a consistent entry point for a particular customer contacting an enterprise. In one embodiment, the automated agent remembers previous interactions with a particular customer (or that the customer had with the contact center), and modifies its responses to future interactions with the same customer to reflect the earlier interactions.

For example, the automated agent may learn to recognize the voice of the customer, which may reduce or prevent the occurrence of fraud when different people call pretending to be the same customer, and may also help improve speech content recognition. In one embodiment, the information collected about a particular customer during each interaction is automatically stored in a central database for automatic retrieval later by the automated agent when interacting with the same customer.

In one embodiment, the automated agent builds a customer profile for each customer that it encounters (or that contacts the contact center), and stores the profile in the central database. The profile may be updated with each future interaction by the same customer, including interactions with the automated agent or with the contact center. In one embodiment, the profile may contain personal identification information of a customer (such as social security number, customer account number, etc.), as well as customer preference information, information about the customer's emotions, moods (for example, a snapshot of a customer's personality built up over time, such as the customer is frequently in a bad mood, or in a bad mood on Mondays), behavior, and transaction history. In one embodiment, the profile may contain a list of transactions initiated by or for the customer but not completed.

A profile may thus contain a static portion (e.g., features, events, qualities) not likely to change over time, and a dynamic portion (e.g., pending transactions, current mood) that are likely or almost certain to change over time. In one embodiment, the profile contains the static portion, while the customer status (or status) contains the dynamic portion.

In one embodiment, the automated agent may supplement existing live agents, such as, for example, when a customer prefers to interact with the automated agent, or when a live agent is not currently available, or when service level agreement (SLA), budget, or other resource considerations dictate that an automated agent should handle a particular interaction over a live agent. In one embodiment, the automated agent may take over most of the work traditionally performed by the live agents of a contact center. In one embodiment, the automated agent is supervised (for example, controlled) by contact center supervisors, who monitor the customer service of the automated agent and intervene if needed. In one embodiment, the automated agent may also act as a supervisor for the contact center live agents.

In one embodiment, the automated agent may be represented as an audio and video avatar that interacts with the customer (for example, on a computer display, such as when connected to the contact center through a web interface). In one embodiment, the automated agent interacts with the customer in a media form, time, and language based on a customer's preference or history of interactions with the automated agent or the contact center, such as plain telephone, smartphone, web, chat, or e-mail. In one embodiment, the automated agent tracks a customer's preference for soft skills (e.g., personality traits, social graces, communication, language, personal habits, friendliness, and optimism that characterize relationships with other people) and matches live agents having these soft skills with the particular customer.

In one embodiment, the automated agent performs as a person, such as a live agent. For example, the automated agent may be an instance of a set of software routines running on a computer that is owned by an enterprise. As such, the automated agent may work for the enterprise. In another embodiment, the instance of the automated agent runs on leased computing resources (such as cloud computing), and the automated agent works for many enterprises sharing the same computing resources.

In one embodiment, the automated agent uses gamification techniques to maintain the customer's interest towards addressing a concern. The automated agent may use, for example, rewards, gradual progress (e.g., small steps), competition, and other psychological devices to instill a positive attitude or mood in the customer to help the customer achieve mutual goals of the contact center and the customer.

In one embodiment, the automated agent may create a social community for customers. By taking advantage of customer's natural tendencies to socialize as well as to share information with those in similar situations, the automated agent may organize customers experiencing similar challenges or concerns into a social community (with, for example, forums with which to interact and communicate). The automated agent could reward activity in the community to foster activity that may be beneficial to, for example, the customers, a sponsoring enterprise, the automated agent, etc. For example, the automated agent may create a small social community of customers who share a similar, but somewhat infrequent, concern. For another example, the automated agent may create a larger social community of customers who share or experience a more frequent concern or situation, but one that does not lend itself to a single or simple solution.

In one embodiment, the automated agent serves in a variety of roles, such as interacting with customers, mediating between customers and an enterprise and its live agents (such as serving as the conduit between the customer and the back office of a contact center), and supervising live agents. For example, by maintaining extensive customer profile information on every interaction between a contact center and a customer, and passing all this customer profile information to the back office, the automated agent may assist or fulfill the traditional back office task of live agent assignment. In an exemplary embodiment, the automated agent assign live agents to customers based on a variety of criteria, such as past experience with live agents by the customer, the mood of the customer (some live agents are more capable of handling particular moods), customer preferences, etc.

In one embodiment, the intelligent automated agent may be configured to have particular traits or capabilities that would be suitable for use in a contact center. These traits or capabilities include deduction-reasoning-problem solving, knowledge representation and commonsense knowledge, planning, learning, natural language processing, perception, creativity, and suitable general intelligence for use in the contact center.

According to an exemplary embodiment of the present invention, a back office services of an intelligent automated agent for a contact center is provided. The back office services is configured to run on a processor coupled to a non-transitory storage device. The back office services includes: a customer profile module configured to access a profile of a customer from a customer profile database stored on the storage device, the profile of the customer including interaction data from interactions involving the customer and the contact center, and analysis results from analyzing the interaction data between the interactions involving the customer and the contact center; and a content analysis module. The content analysis module is configured to generate new analysis results by performing the analyzing of the interaction data between consecutive interactions of the interactions involving the customer and the contact center, and update the analysis results of the profile of the customer on the storage device to reflect the new analysis results. The intelligent automated agent is configured to run on the processor, take part in a next interaction of the interactions involving the customer and the contact center by accessing the profile of the customer, adjust its behavior in the next interaction by factoring in the analysis results of the accessed profile of the customer, and update the interaction data of the accessed profile on the storage device to reflect the next interaction.

The analysis results may include actions to be taken by the automated agent during future interactions of the interactions involving the customer and the contact center. The automated agent may be further configured to perform the actions during the future interactions.

The content analysis module may be further configured to run on the processor as a background process when computing resources of the processor are available.

The content analysis module may be further configured to generate additional analysis results between the consecutive interactions after an update to the content analysis module by re-analyzing the interaction data after the updating of the profile of the customer to reflect the new analysis results, and update the analysis results of the profile of the customer on the storage device to reflect the additional analysis results.

The back office services may further include a live agent assignment module configured to assign an appropriate live agent from a pool of live agents to the customer based on the analysis results of the profile of the customer.

The back office services may further include a suggested response handling module configured to delete or alter suggested responses to the customer based on the analysis results of the profile of the customer.

The back office services may further include a classification module configured to classify customers of the contact center into different classifications based on their corresponding analysis results of their profiles. The content analysis module may include a plurality of content analysis modules corresponding to the different classifications.

The analysis results may include a list of pending transactions and/or requests by the customer that are not yet completed. The automated agent may be further configured to address the pending transactions and/or requests during future interactions of the interactions involving the customer and the contact center.

According to another exemplary embodiment of the present invention, a method of providing back office services for a contact center to a customer through an intelligent automated agent is provided. The method includes: running the intelligent automated agent on a processor coupled to a non-transitory storage device; accessing a profile of the customer from a customer profile database stored on the storage device, the profile of the customer including interaction data from interactions involving the customer and the contact center, and analysis results from analyzing the interaction data between the interactions involving the customer and the contact center; generating new analysis results by performing the analyzing of the interaction data between consecutive interactions of the interactions involving the customer and the contact center; updating the analysis results of the profile of the customer on the storage device to reflect the new analysis results; re-accessing the profile of the customer during a next interaction of the interactions involving the customer and the contact center; adjusting a behavior of the automated agent during the next interaction by factoring in the analysis results of the re-accessed profile of the customer; and updating the interaction data of the re-accessed profile on the storage device to reflect the next interaction.

The analysis results may include actions to be taken by the automated agent during future interactions of the interactions involving the customer and the contact center. The method may further include performing the actions by the automated agent during the future interactions.

The method may further include generating additional analysis results between the consecutive interactions by re-analyzing the interaction data using newer analysis criteria since the updating of the analysis results of the profile of the customer to reflect the new analysis results, and updating the analysis results of the profile of the customer on the storage device to reflect the additional analysis results.

The method may further include assigning an appropriate live agent from a pool of live agents to the customer based on the analysis results of the profile of the customer.

The method may further include deleting or altering suggested responses to the customer based on the analysis results of the profile of the customer.

The method may further include classifying customers of the contact center into different classifications based on their corresponding analysis results of the profiles of the customers, and generating corresponding new analysis results by performing the analyzing of respective interaction data of the profiles of the customers using different analysis criteria for the different classifications.

The analysis results may include a list of pending transactions and/or requests by the customer that are not yet completed. The method may further include addressing the pending transactions and/or requests during future interactions of the interactions involving the customer and the contact center.

According to yet another exemplary embodiment of the present invention, a back office services of an intelligent automated agent for a contact center is provided. The automated agent includes a processor, a non-transitory storage device configured to store customer profile data, and a memory. The memory has instructions stored thereon that, when executed by the processor, causes the processor to: access a profile of the customer from a customer profile database stored on the storage device, the profile of the customer including interaction data from interactions involving the customer and the contact center, and analysis results from analyzing the interaction data between the interactions involving the customer and the contact center; generate new analysis results by performing the analyzing of the interaction data between consecutive interactions of the interactions involving the customer and the contact center; update the analysis results of the profile of the customer on the storage device to reflect the new analysis results; re-access the profile of the customer during a next interaction of the interactions involving the customer and the contact center; adjust a behavior of the automated agent during the next interaction by factoring in the analysis results of the re-accessed profile of the customer; and update the interaction data of the re-accessed profile on the storage device to reflect the next interaction.

The analysis results may include actions to be taken by the automated agent during future interactions of the interactions involving the customer and the contact center. The instructions, when executed by the processor, may further cause the processor to perform the actions during the future interactions.

The instructions, when executed by the processor, may further cause the processor to generate additional analysis results between the consecutive interactions by re-analyzing the interaction data using newer analysis criteria since the updating of the analysis results of the profile of the customer to reflect the new analysis results, and update the analysis results of the profile of the customer on the storage device to reflect the additional analysis results.

The instructions, when executed by the processor, may further cause the processor to classify customers of the contact center into different classifications based on their corresponding analysis results of the profiles of the customers, and generate corresponding new analysis results by performing the analyzing of respective interaction data of the profiles of the customers using different analysis criteria for the different classifications.

The analysis results may include a list of pending transactions and/or requests by the customer that are not yet completed. The instructions, when executed by the processor, may further cause the processor to address the pending transactions and/or requests during future interactions of the interactions involving the customer and the contact center.

According to the above and other embodiments of the present invention, an intelligent automated agent for a contact center provides enhanced customer service by performing the roles of a live agent but without the limitations of a live agent or a live agent with IVRs. By maintaining personal profiles, embodiments of the present invention provide for an automated agent that learns about the customer from each interaction with the automated agent and with the contact center, and interacts like a human (for example, having its own personality, preferences, mood, etc.) across the different media channels to provide a better and more personalized service than is possible with live agents alone or live agents with IVRs. In addition, by maintaining a comprehensive record (such as with the profile) of a specific customer, embodiments of the present invention provide for an automated agent with a better and more consistent recollection of a customer's previous interactions with the contact center than is possible with a pool of live agents or live agents with IVRs.

BRIEF DESCRIPTION OF THE DRAWINGS

The accompanying drawings, together with the specification, illustrate exemplary embodiments of the present invention. These drawings, together with the description, serve to better explain aspects and principles of the present invention.

DETAILED DESCRIPTION

Figure 1:
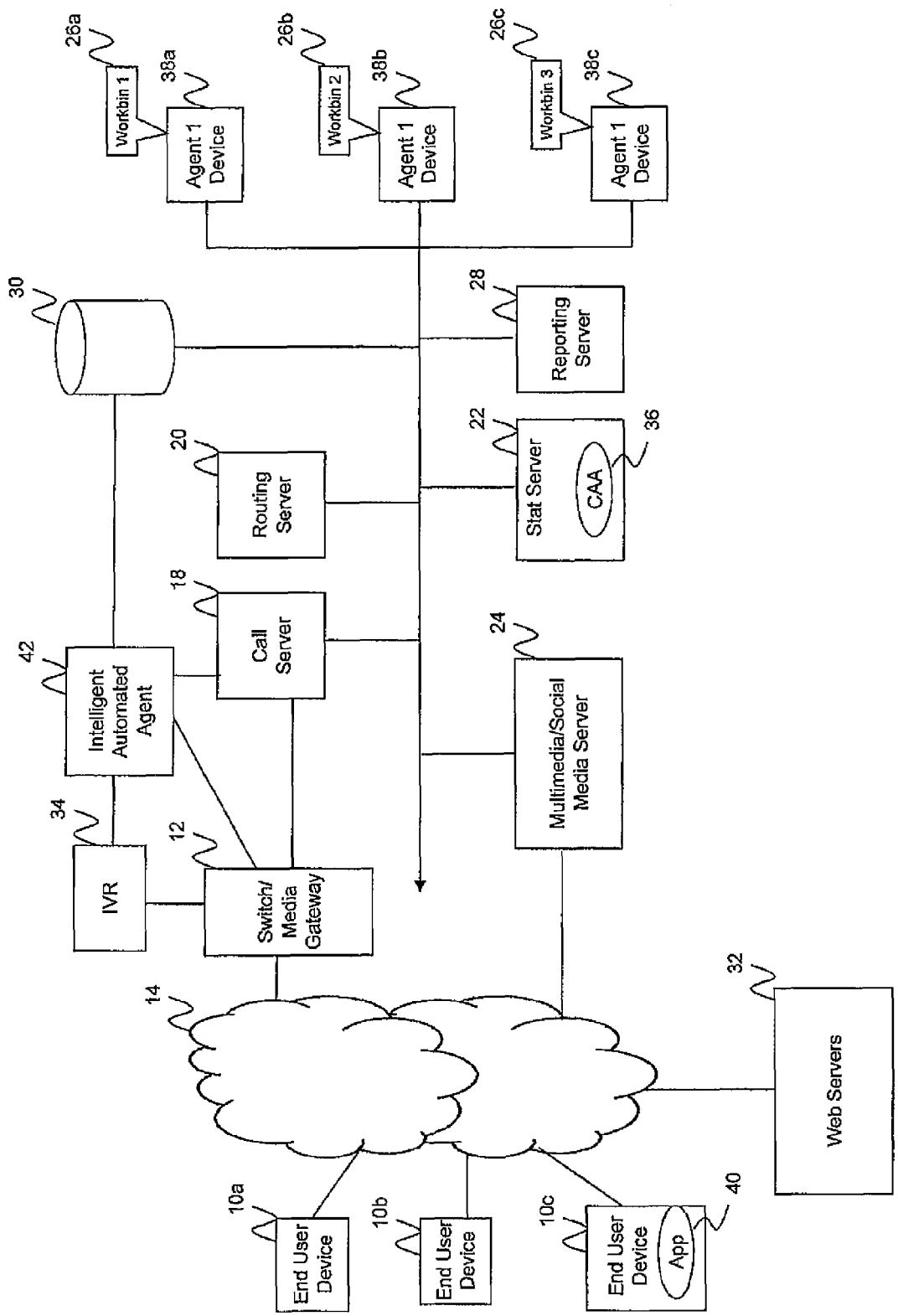
FIG. 1 is a schematic block diagram of a system supporting a contact center that is configured to provide an intelligent automated agent according to one exemplary embodiment of the present invention.

The operation of existing contact centers lacks sophisticated personalized service, especially in the self-service mode through IVR-type interfaces. Customers tend to prefer interacting with live agents versus the limited and impersonalized service available from IVR interfaces. Live agents often lack the skills, or give inappropriate or inconsistent assistance in contact center environments, where customers often experience a different live agent with every attempt to address a concern or problem. An intelligent automated agent according to exemplary embodiments of the present invention addresses these and other deficiencies of live agents and/or IVR interfaces by applying artificial intelligence methods in order to create a highly personalized customer portal including technologies such as audio and video avatars interacting with the customer. This concept of automated personalized service may also be applied to back office processing of customer interactions and other media such as chat, email, web, etc., and may be tailored to the specifics of customer contact devices such as computers, PDAs, plain telephones, or smartphones.

Exemplary embodiments of the present invention will now be described with reference to the accompanying drawings. In the drawings, the same reference numbers refer to the same or substantially the same elements throughout. In addition, the term "enterprise" may refer to any business or organization (such as a corporation) or other entity that desires to interact with customers through a contact center. The term "customer" may refer to any person, contact, or end user (such as a client, customer, business contact, prospective customer, etc.), or group of such people, or entity acting in the capacity of such a person or group of such people (for example, an automated agent working on behalf of another enterprise, such as for a business-to-business interaction between enterprises) desiring to receive services from or otherwise communicate with the enterprise through the contact center.

The term "live agent" may refer to any person working through the contact center interface to assist the customer. The term "call" may refer to any telephone call, voice or text exchange (such as chat or instant messaging) representing a live communication between the customer and the agent. The term "automated agent" or "intelligent automated agent" may refer to any computer-implemented entity that carries out the role of the agent in certain capacities.

FIG. 1 is a schematic block diagram of a system supporting a contact center that is configured to provide an intelligent automated agent according to one exemplary embodiment of the present invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art, and/or an LTE or any future public communication network.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the present invention, the switch is coupled to a call server 18 which may, for example, serve as an adapter or interface between the switch and the remainder of the routing, monitoring, and other call-handling systems of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the present invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18, which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server 18 may place the call in, for example, a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to a corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via a variety of communication mechanisms such as chat, instant messaging, voice calls, and the like.

The selection of an appropriate agent for routing an inbound call may be based, for example, on a routing strategy employed by the routing server 20, and further based on information about agent availability, skills, and other routing parameters provided, for example, by a statistics server 22. According to one exemplary embodiment of the present invention, the statistics server 22 includes a customer availability aggregation (CAA) module 36 for monitoring availability of end users on different communication channels and providing such information to, for example, the routing server 20, agent devices 38a-38c, and/or other contact center applications and devices.

In one embodiment, the statistics server 22 may be replaced with a separate statistics server for maintaining the status of live agents as routing targets, and a separate statistics server for maintaining the status of customers as reach-out targets (as may be implemented in the CAA module). For example, the CAA module may also be deployed in a separate application server. The aggregation module 36 may be a software module implemented via computer program instructions which are stored in memory of the statistics server 22 (or some other server), and which program instructions are executed by a processor. A person of skill in the art should recognize that the aggregation module 36 may also be implemented via firmware (e.g. an application-specific integrated circuit), hardware, or a combination of software, firmware, and hardware.

According to one exemplary embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The multimedia/social media server 24 may also be configured to monitor and track interactions on those websites.

The multimedialsocial media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedialsocial media server 24 may monitor the status settings and send updates to the aggregation module 36 each time the status information changes.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the present invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the present invention, the contact center also includes one or more mass storage devices 30 for storing different databases relating to agent data (e.g., agent profiles, schedules, etc.), customer data (e.g., customer profiles), interaction data (e.g., details of each interaction with a customer, including reason for the interaction, disposition data, time on hold, handle time, etc.), and the like. According to one embodiment, some of the data (e.g., customer profile data) may be provided by a third party database such as, for example, a third party customer relations management (CRM) database. The mass storage device may take form of a hard disk or disk array as is conventional in the art.

According to one exemplary embodiment of the present invention, the contact center also includes an intelligent automated agent 42 for handling calls or other interactions (e.g., web) with customers. The automated agent 42 may be implemented, for example, on a server. The automated agent 42, for example, may include capabilities, such as voice recognition, speech recognition, answer generation, speech generation, and customer profile information that enables the automated agent 42 to perform agent roles without having to use a live agent. For instance, in one embodiment, the automated agent 42 maintains a database of customer profile information (for example, as stored on a nonvolatile storage device, such as a disk drive or mass storage device 30) that may be updated with each interaction between the customer and the contact center.

The automated agent 42 may be connected to the switch/media gateway 12 to directly switch the customer (for example, via end user device 10a) to the automated agent 42. The automated agent 42 may also be connected to the IVR server 34 to allow the IVR server 34 to communicate directly with the automated agent 42 (for example, to communicate information related to a current call being handled by the IVR server 34 to the automated agent 42). For example, the IVR server 34 may decide to no longer handle the current call and instead hand control of the customer's call to the automated agent 42 for some or all of the processing that otherwise might be handled by, for instance, the IVR server 34 and/or a live agent 38. The automated agent 42 may also be connected to the call server 18 to allow the call server 18 to communicate directly with the automated agent 42 (for example, to transfer a call to the automated agent 42 in place of one of the live agents 38). For example, the contact center may route all calls to the automated agent 42 when there are no live agents 38 available.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

It should also be appreciated from the above that various structures and functions may be incorporated into a variety of apparatuses. In some embodiments, hardware components such as processors, controllers, and/or logic may be used to implement the described components. In some embodiments, code such as software or firmware executing on one or more processing devices may be used to implement one or more of the described operations or components.

Figure 2:
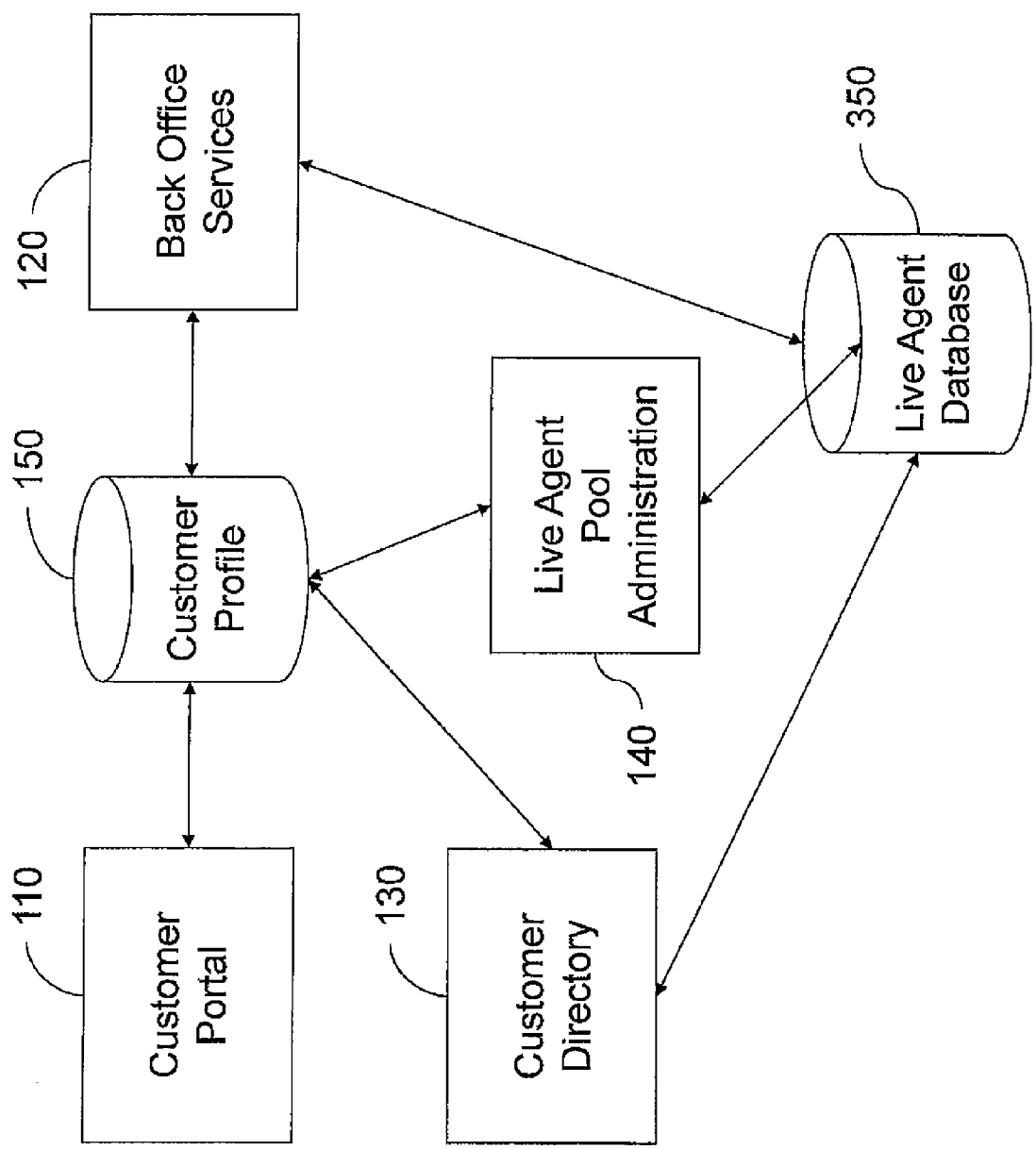
FIG. 2 is a schematic block diagram of several components of an intelligent automated agent according to an exemplary embodiment of the present invention.

FIG. 2 is a schematic block diagram of several components of an intelligent automated agent (such as the automated agent 42 of the contact center of FIG. 1) according to an exemplary embodiment of the present invention. The automated agent may create and maintain a rich profile of each of the customers of the contact center. For example, the automated agent may maintain customer profiles having such information as the customer's preferred media channels (e.g., plain telephone, web, smartphone, chat, e-mail, social media, live agent, etc.), the customer's preferred soft skills in live agents, the customer's preferred and blocked times for interactions, etc. In one embodiment, the automated agent performs in real time, interacting with the customer to appear to the customer as if the automated agent was a live agent or at least a very sophisticated IVR-type application.

In one embodiment, the automated agent may run in one of several modes, such as self service (for example, handling an entire customer interaction without using a live agent) or assisted service (for example, delegating certain tasks to a live agent, depending on factors such as the nature of the problem, customer preference, customer service level agreement, etc.) The automated agent, for example, may have specific front-end interfaces tailored to corresponding customer contact devices or methods, such as web, plain telephones, smartphones, text messages, etc. In one embodiment, the automated agent's functions may further include back office services, such as live agent assignment.

For instance, the automated agent may assign live agents to the customer based on factors such as the customer's preferred soft skills in live agents, the customer's current mood, the customer's previous experiences with specific live agents, live agent grade (e.g., a live agent at a sufficient level to be authorized to make decisions desired by the customer), etc. The automated agent may also be granted an agent grade to reflect the decisions that the automated agent is authorized to make on behalf of the enterprise.

In one embodiment, the automated agent communicates over any of the standard media channels for contact center interaction (including, for example, plain telephone, smartphone, chat, web, and e-mail). For instance, the automated agent may tailor its front-end interface to suit the preference of a particular customer, based on factors such as the expressed desire of the customer, the customer's previous interactions with the contact center, or the customer's method of contacting the contact center.

The automated agent of FIG. 2 may include several modules and databases, including, for example, a customer portal module 110, back office services module 120, a customer directory database 130, and a live agent pool administration module 140. The customer portal module 110 represents the interface between the customer and the contact center (such as the back office of the contact center). The customer portal module 110 may access profile information about the customer that is built up from various sources (such as the present interaction as well as earlier interactions between the customer and the automated agent or the contact center) and may store this information in a customer profile 150 (for example, in a database stored on a nonvolatile storage device, such as a disk drive).

The automated agent may also maintain a live agent database 350 for storing and retrieving information about each of the live agents working at the contact center (for example, their hard and soft skills, their availability, etc.) In one embodiment, this functionality of the automated agent may be separate from, partially overlap, or totally subsume that of the statistics server (such as the statistics server 22 of FIG. 1). For example, the automated agent may manage the presence or availability (such as immediate availability) information of the live agents. These modules and databases are described in further detail with reference to FIGS. 3-9.

Figure 3:
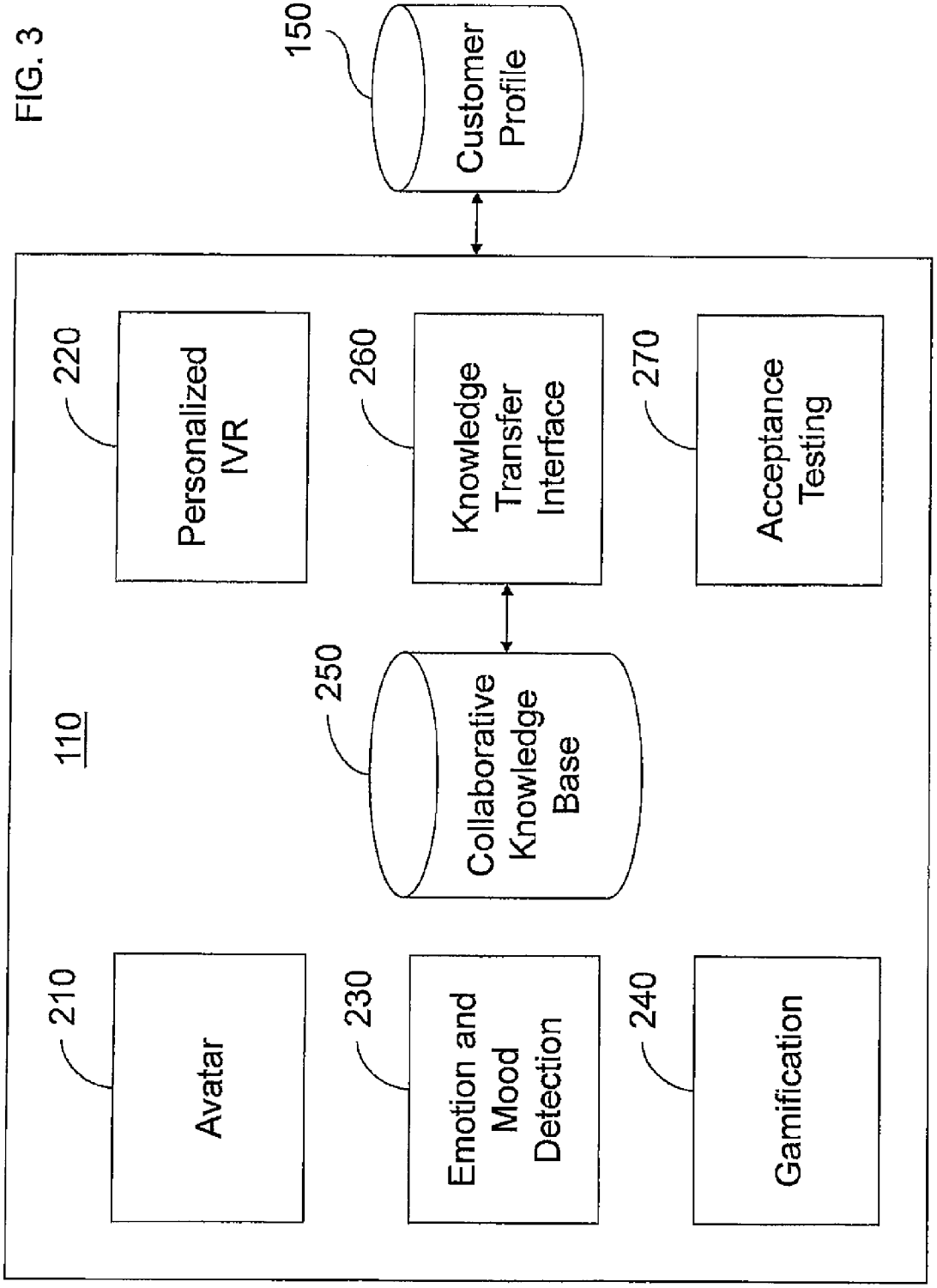
FIG. 3 is a schematic block diagram of several components of a customer portal module of an intelligent automated agent according to an exemplary embodiment of the present invention.

FIG. 3 is a schematic block diagram of several components of a customer portal module (such as the customer portal module 110 of FIG. 2) of an intelligent automated agent according to an exemplary embodiment of the present invention. The customer portal module 110 of FIG. 3 is for providing a personalized (for example, customized) access layer for customer interactions. The customer portal module 110 may provide, for example, an avatar for voice and/or video communication (such as over the web or a smartphone) as implemented by an avatar module 210. In another embodiment, the avatar module 210 provides for voice communication (such as over a plain telephone). The customer portal module 110 may also include a personalized IVR module 220 for presenting a personalized IVR dialogue to the customer, a customer emotion and mood detection module 230 for detecting emotions, moods, sentiments, etc., of a customer, a gamification module 240 for applying gamification concepts within interactions with the customer, a knowledge transfer interface 260 (with corresponding collaborative knowledge base 250) for organizing knowledge transfer between customers, and an acceptance testing module 270 for doing customer acceptance testing on various contact center protocols (such as IVR scripts, live agent scripts, routing rules, etc.) across different customer profiles.

The customer portal module 110, for example, may use voice recognition and speech recognition software as known to one of ordinary skill in the art to identify a customer and convert the customer's spoken interaction into words. In one embodiment, the speech recognition may utilize the speech recognition technology described in Konig et al., U.S. Pat. No. 7,487,094, "SYSTEM AND METHOD OF CALL CLASSIFICATION WITH CONTEXT MODELING BASED ON COMPOSITE WORDS," the entire content of which is incorporated herein by reference, or may be done with other suitable speech recognition technologies.

Figure 4:
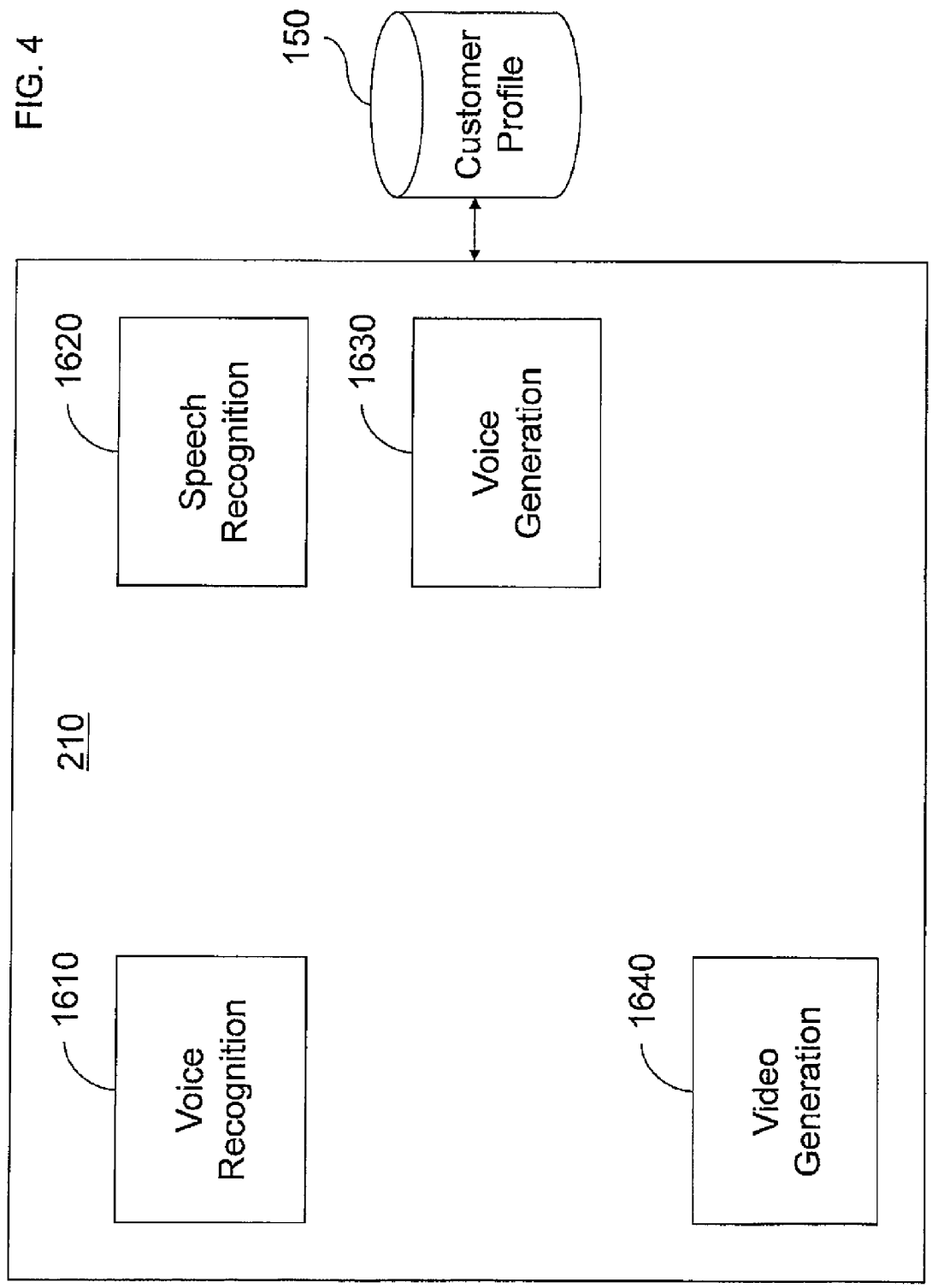
FIG. 4 is a schematic block diagram of several components of an avatar module of an intelligent automated agent according to an exemplary embodiment of the present invention.

FIG. 4 is a schematic block diagram of several components of an avatar module (such as the avatar module 210 of FIG. 3) of an intelligent automated agent according to an exemplary embodiment of the present invention. The avatar module of FIG. 4 is for presenting to the customer a personal and person-like interface (as with a live agent) to the contact center. To this end, the avatar module may have a voice recognition module 1610 for recognizing the voice of the customer, a speech recognition module 1620 for recognizing the speech (for example, words or text) being spoken by the customer, a voice generation module 1630 for generating the voice of the avatar (for example, from words or text), a video generation module 1640 for generating the visual appearance of the avatar to the customer (for example, on a display screen).

According to one embodiment, the customer portal module 110 may present a personalized IVR dialogue to the customer as implemented by the personalized IVR module 220. In one embodiment, this personalized IVR module 220 arranges questions and possible responses based, for example, on the customer profile 150. For instance, questions for which the profile 150 already has a previous response may be skipped, or re-asked in an acknowledgment form (such as, "Is XXX-XXX-XXXX still a good phone number to contact you?") as directed by the personalized IVR module 220.

The customer portal module 110 of FIG. 3 may interact with the customer (for example, through components such as the avatar module 210 of the personalized IVR module 220) as tuned by the customer's preferences, which may be stored in the customer profile 150. For example, preferred media channels (such as text, speech, smartphone, web, plain telephone), time profile (such as Monday through Friday, 9:00 a.m. through 5:00 p.m., Eastern Standard Time), language (such as U.S. English), etc., for the customer may be stored in the customer profile 150. In one embodiment, the customer profile 150 maintains multiple preferences for the customer, such as plain telephone and web. These preferences may be ordered (for example, plain telephone may be ordered first and web ordered second), or they may have different components (for example, plain telephone may have a time profile of Monday through Friday, 9:00 a.m.-5:00 p.m., while web may have a time profile of anytime). Customers may also have preferences for multiple languages (such as English and French) with different profile information for each (such as text for French, and text and speech for English) or preferences for one language over another.

In one embodiment, the customer's moods, emotions, sentiments, etc., are detected by the customer portal module 110 using the customer emotion and mood detection module 230. The customer emotion and mood detection module 230 may detect soft factors as expressed by the customer, for example, in their voice, their speech (e.g., words), and/or their gestures or other visual cues.

Figure 5:
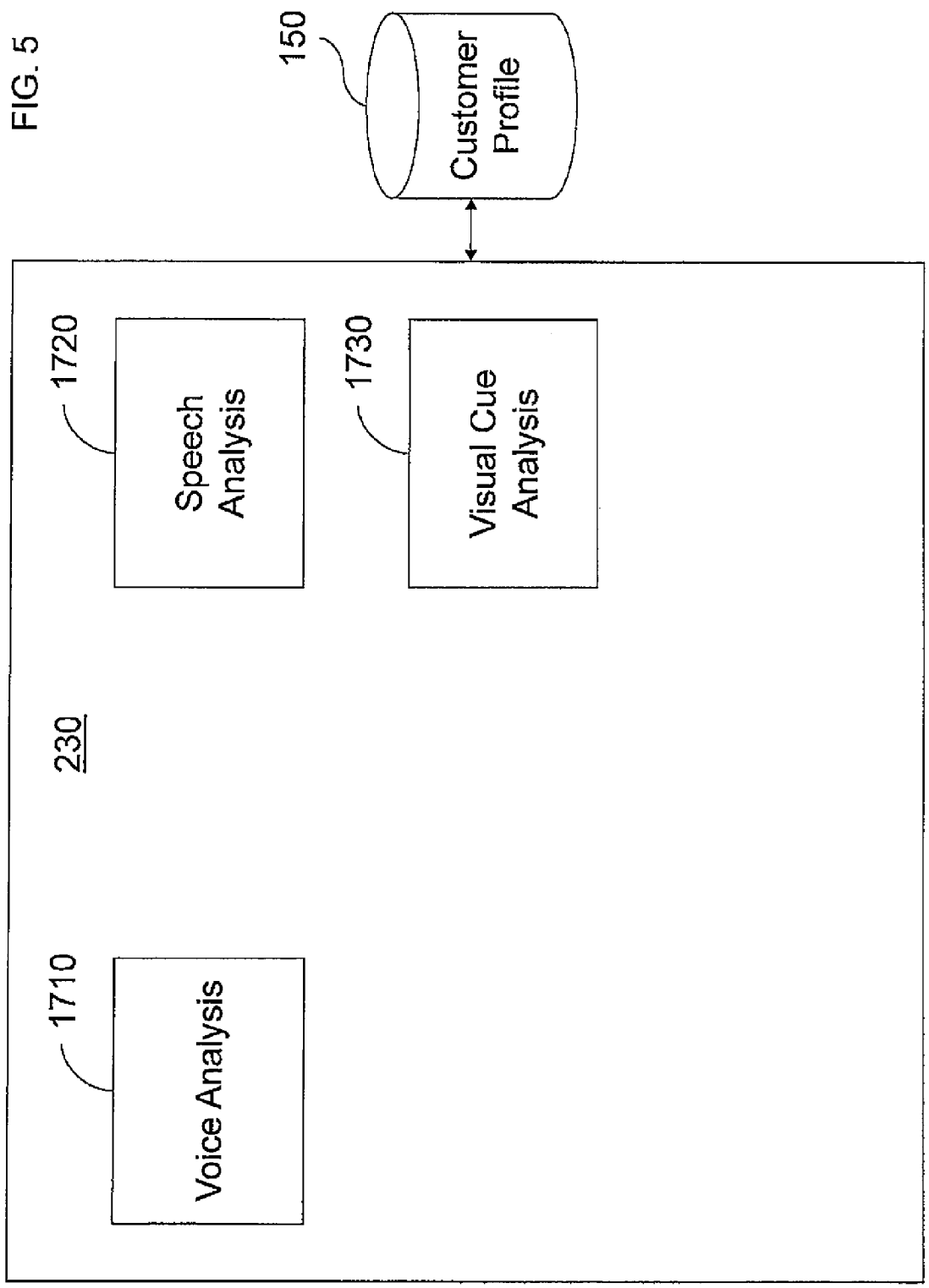
FIG. 5 is a schematic block diagram of several components of a customer emotion and mood detection module of an intelligent automated agent according to an exemplary embodiment of the present invention.

FIG. 5 is a schematic block diagram of several components of a customer emotion and mood detection module (such as the customer emotion and mood detection module 230 of FIG. 3) of an intelligent automated agent according to an exemplary embodiment of the present invention. The customer emotion and mood detection module 230 of FIG. 5 may include a voice analysis module 1710 for analyzing customer voice samples, a speech analysis module 1720 for analyzing customer speech samples (for example, words and phrases spoken by the customer), and a visual cue analysis module 1730 for analyzing customer gestures and other visual cues for detecting possible customer emotions, moods, sentiments, etc., as expressed to the contact center (for example, to the automated agent's avatar during an interaction).

For example, in one embodiment, the emotion and mood detection module 230 may include the voice analysis module 1710 to sense the customer's current sentiments, moods, etc., by analyzing the customer's voice pattern. For instance, the voice analysis module 1710 may compare the current voice pattern of the customer (such as from the present interaction) against that of a voice pattern of a general population, or of a population fitting the customer profile 150, or of the customer (as built up, for instance, from earlier interactions with the automated agent or contact center and saved in the customer's profile 150).

In one embodiment, the voice analysis module 1710 may use voice biometric technology to compare known voice recordings of the customer (as stored, for example, in the customer profile 150) to new conversations to determine who is speaking. The voice biometric technology may involve, for example, recording words to capture the frequencies associated with a customer's voice, and using statistical models to extrapolate speech patterns. These speech patterns may be as accurate as a fingerprint in identifying a speaker. A person's voice is affected also by variables like mood and health, which may be detected by comparing present voice samples of the customer to, for example, the previous voice recordings or an established voice pattern of the customer.

For another example, in one embodiment, the emotion and mood detection module may include the speech analysis module 1720 to detect the customer's current sentiments, moods, etc., by analyzing the customer's speech (such as words, phrases, or sentences). Emotions and moods, for example, may be detected by converting the customer's speech to text (using, for example, the speech recognition module 1165 of FIG. 14) and then analyzing the text for a set of pre-defined phrases, words, etc. (e.g., derogatory, profane, condescending, polite, etc.) which could identify the mood or emotions of a person. Customer speech samples may also be maintained in the customer profile for comparison with future speech samples to see if the customer may be employing different speech patterns in a current interaction, which may be useful in emotion and mood detection.

For another example, in one embodiment, the emotion and mood detection module 230 may include the visual cue analysis module 1730 to sense the customer's current sentiments, moods, etc., by analyzing the customer's facial or body expressions or characteristics. Like voice pattern analysis, visual cues may be identified for the particular customer (as collected from earlier interactions with the customer and stored in the customer's profile) as well as from a general population or of a population fitting the customer profile 150 (such as a sampling from persons of the same culture as the customer, as expressions and body language may vary by culture).

From this or these comparisons, the emotion and mood detection module 230 may use the voice analysis module 1710, the speech analysis module 1720, and/or the visual cue analysis module 1730 to determine, for example, if the customer is talking louder or softer, faster or slower, etc., than normal or usual, or if the customer is exhibiting voice patterns characteristic of agitation (such as with word selection or intonation), or if the customer is expressing anger, pleasure, frustration, etc., in his outward visual appearance.

For instance, the emotion and mood detection module 230 may determine that the customer is angry (for example, from a loud voice, profane language, and/or clenched teeth). From this detection, the automated agent, for example, may direct the customer to a live agent, such as a live agent that is skilled with dealing with angry customers (e.g., a live agent with good anger management skills). More advanced processing may take specifics of the customer into account, e.g., to recognize irony or sarcasm, or to detect the actual frustration level of the customer. For instance, based on previous interactions with the customer, as recorded in the customer profile 150, the customer may be significantly more likely than the general population to use irony or sarcasm, or the customer may exhibit varying degrees of frustration or anger when interacting with the contact center.

In one embodiment, the emotion and mood detection module 230 may determine if the customer is impatient (for example, when the customer tries responding before being prompted or before hearing many of the possible responses, or if the patient is rolling his eyes or appearing agitated) and, if so, may adjust the automated agent to respond differently. For example, the automated agent may speed up its IVR dialog, or may use more abbreviated scripts if the customer seems to be losing his or her patience with the current delivery rate of scripted dialogue from the personalized IVR module 220. In one embodiment, the emotion and mood detection module 230 may utilize the mood or emotional state detection technology described in Scott et al., U.S. Patent Appl. Pub. No. 2011/0010173, "SYSTEM FOR ANALYZING INTERACTIONS AND REPORTING ANALYTIC RESULTS TO HUMAN-OPERATED AND SYSTEM INTERFACES IN REAL TIME," the entire content of which is incorporated herein by reference, or may be done with other suitable mood or emotional state detection technologies.

In one embodiment, the customer portal module 110 includes the gamification module 240 for applying gamification concepts (such as making tasks seem more like games, with incentives and/or rewards, trying to leverage the customer's natural inclination to finish tasks or achieve success) within interactions with the customer. The gamification module 240, for example, may involve the customer more in one of the personalized IVR dialogs by turning an information gathering procedure into a game in which the customer provides answers to achieve levels of completion towards a goal desired by the customer (e.g., solution of a problem, provision of desired information, etc.) Addressing customer concerns may also be beneficial to the enterprise running the contact center, not only in keeping their customer base satisfied but also in exposing potential problems or areas of improvement before or while they are affecting other customers.

By guiding the customer through the gamification process, the automated agent may engage the customer in a more interactive experience, such as an experience where the customer has sight of the goal, the obstacles faced by the automated agent in helping the customer achieve the goal, and the missing links that the customer needs to provide so that the customer and the automated agent working together may achieve the goal. This may help the customer maintain a more positive and cooperative attitude or mood throughout the process. The gamification module 240 may introduce actual game elements, such as letting customers compete (for example, being the first to identify problems or solutions, finding or identifying the most problems or solutions, finding the best solution, etc.) In one embodiment, the gamification module may use a more subtle (and possibly more effective) approach, namely learning from the psychological principles of gaming, such as conveying the experience of permanent progress (for example, after adapting to a customer's individual capabilities or skills).

In one embodiment, the customer portal module 110 may also include the collaborative knowledge base 250 and the knowledge transfer interface 260 for organizing knowledge transfer between customers. For example, the collaborative knowledge base 250 may be organized as a database and stored on a nonvolatile storage device (such as a disk drive, cloud storage, etc.) Here, the goal may be two-fold: solve the problem raised by the customer, and then learn from the experience by recording the solution in the collaborative knowledge base 250 to help others.

Gamification principles could be used here as well. For example, the gamification module 240 could offer incentives to customers who help diagnose problems and their solutions by rewarding customers whose solutions later turn out to benefit other customers. People are driven naturally by a sense of altruism to help others, but this may be exploited more fully by letting them be the first to find a solution, and rewarding them for each other customer they help with the same problem (for example, for each other customer whose problem is fixed by being directed to the same solution). Rewards may be, for example, financial (e.g., money, merchandise, discounts), virtual (such as frequent flyer points, that at some point may be convertible into a financial reward), or psychological (e.g., goodwill, such as "your contribution has helped over 100 other customers avoid the same problem").

For example, in one embodiment, the collaborative knowledge base 250 may be organized by concepts (such as particular terms, problems, and solutions) in addition to other criteria (such as customer, system, time, etc.) and may be searched via the knowledge transfer interface 260 as a series of questions and answers utilizing these terms or other criteria to direct the customer to the appropriate solution. For example, both the search path taken by the knowledge transfer interface 260 as well as the solution reached may be stored in the collaborative knowledge base 250. In this fashion, future searches by the knowledge transfer interface 260 may search, for example, for one or both of the possible solution or a search path by a previous customer (including possibly the same customer) who searched in this manner before. The solution may then be found, for example, by a direct search of the collaborative knowledge base, or from the solution of the previous customer, or by connecting the previous customer to the present customer (by, for example, forums), possibly rewarding the previous customer in the process.

Rewards may be, for example, any form of consideration or compensation that motivates the customer to contribute to the collaborative knowledge base to help other customers. For instance, rewards may be monetary (e.g., currency, gift cards, service credits), virtual (e.g., points that may be accumulated and applied to something of value to the customer), etc.

An exemplary process flow of the knowledge transfer interface will now be described with reference to FIG. 6. Each of the processes in the present application may be described in terms of a software routine executed by one or more processors based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Figure 6:
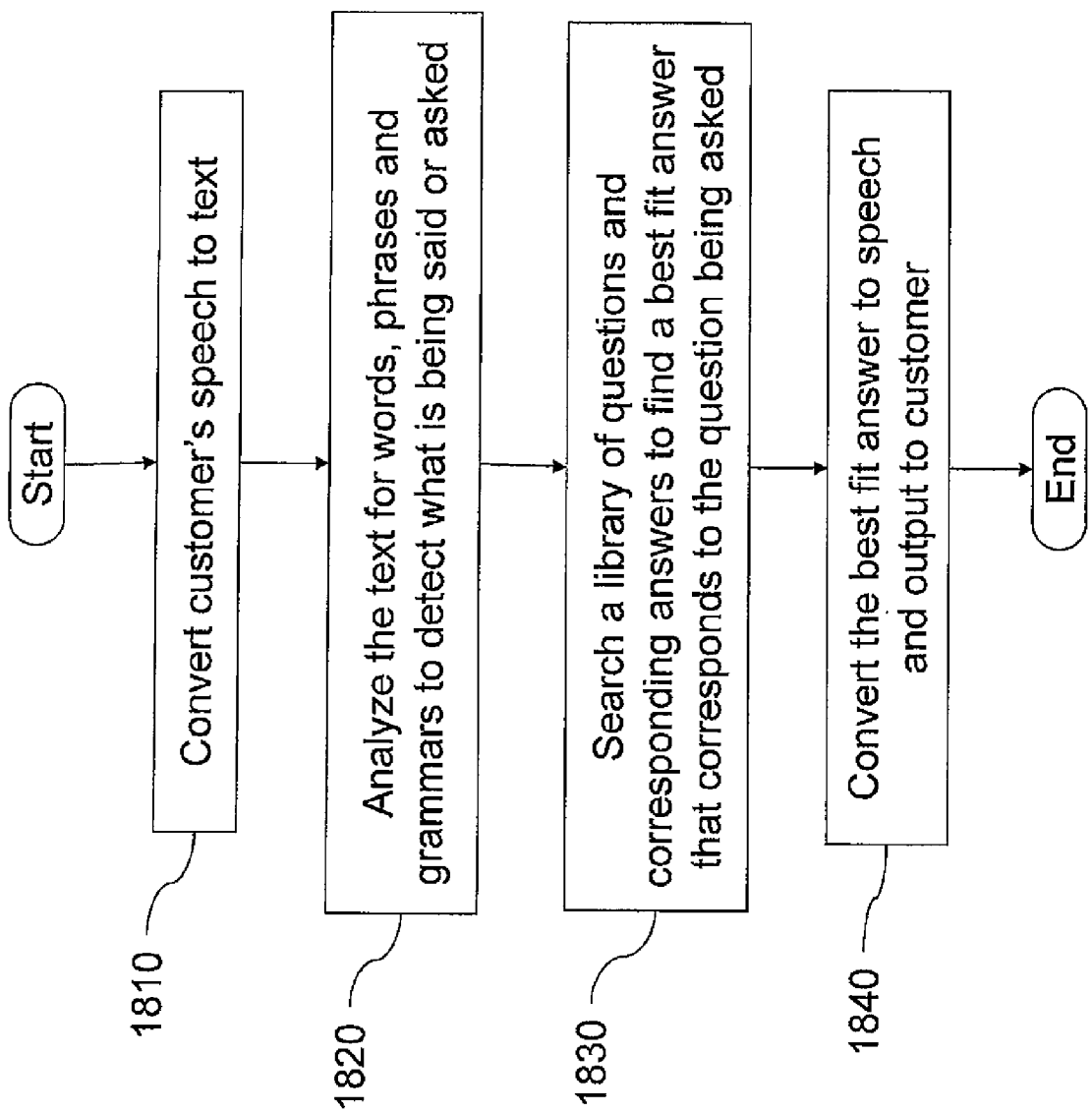
FIG. 6 is a flowchart of a process executed by a knowledge transfer interface of an intelligent automated agent according to an exemplary embodiment of the present invention.

FIG. 6 is a flowchart of a process executed by a knowledge transfer interface (such as the knowledge transfer interface 260 of FIG. 3) of an intelligent automated agent according to an exemplary embodiment of the present invention. The process shown in FIG. 6 is for using the collaborative knowledge base 250 to answer a question spoken by a customer. Processing begins, and in step 1810, a customer's speech is converted to text (using, for example, the speech recognition module 1165 of FIG. 14). In step 1820, the text is analyzed (for example, based on a pre-defined algorithm) for words, phrases, and grammar to detect what is being said or asked, etc. The analysis may include, for example, identifying question words or phrases (e.g., "how much," "who," or "what"), subject words, verbs, direct objects, etc., to parse the text into a form of a question. A similar analysis may be performed to analyze non-question statements.

In step 1830, a library of responses (for example, pre-defined answers) may be searched (for example, based on a search algorithm) to find the best fit to what was said or asked, etc. The library of responses, for example, may be part of the collaborative knowledge base 250, and cross-indexed or arranged with corresponding questions or statements (for example, a library of questions) to which they may pertain. In one embodiment, the collaborative knowledge base 250 is dynamic, growing and/or refining its library of statements, library of questions, or the relationships between the two libraries at the direction of the knowledge transfer interface 260. The search algorithm may be a pre-defined search algorithm for searching databases and returning relevant results as is known to one of ordinary skill in the art. In step 1840, the best fit answer is converted to speech (using, for example, the speech synthesis module 1170 of FIG. 14) and output to the customer.

Returning to FIG. 3, in one embodiment, the customer portal module 110 may have a customer acceptance testing module 270 for doing customer acceptance testing on, for example, IVR scripts, live agent scripts, routing rules, etc., versus different customer profiles (as collected, for example, in the customer profile 150). For example, the acceptance testing module 270 may test a proposed IVR script on particular customer profiles (for example, particular geographical regions or business relationships) to gauge its effectiveness. If, for instance, the particular IVR script is only effective (e.g., understood) with some profiles and not others, the IVR script may be tagged to only be delivered to those customers profiles for which it is effective. Likewise, if the IVR script is not effective with certain customer profiles (for example, customers in these customer profiles find the IVR script to be very confusing), the IVR script may be pulled from distribution to these customer profiles and either rewritten or otherwise enhanced to improve its effectiveness to these customer profiles.

Figure 7:
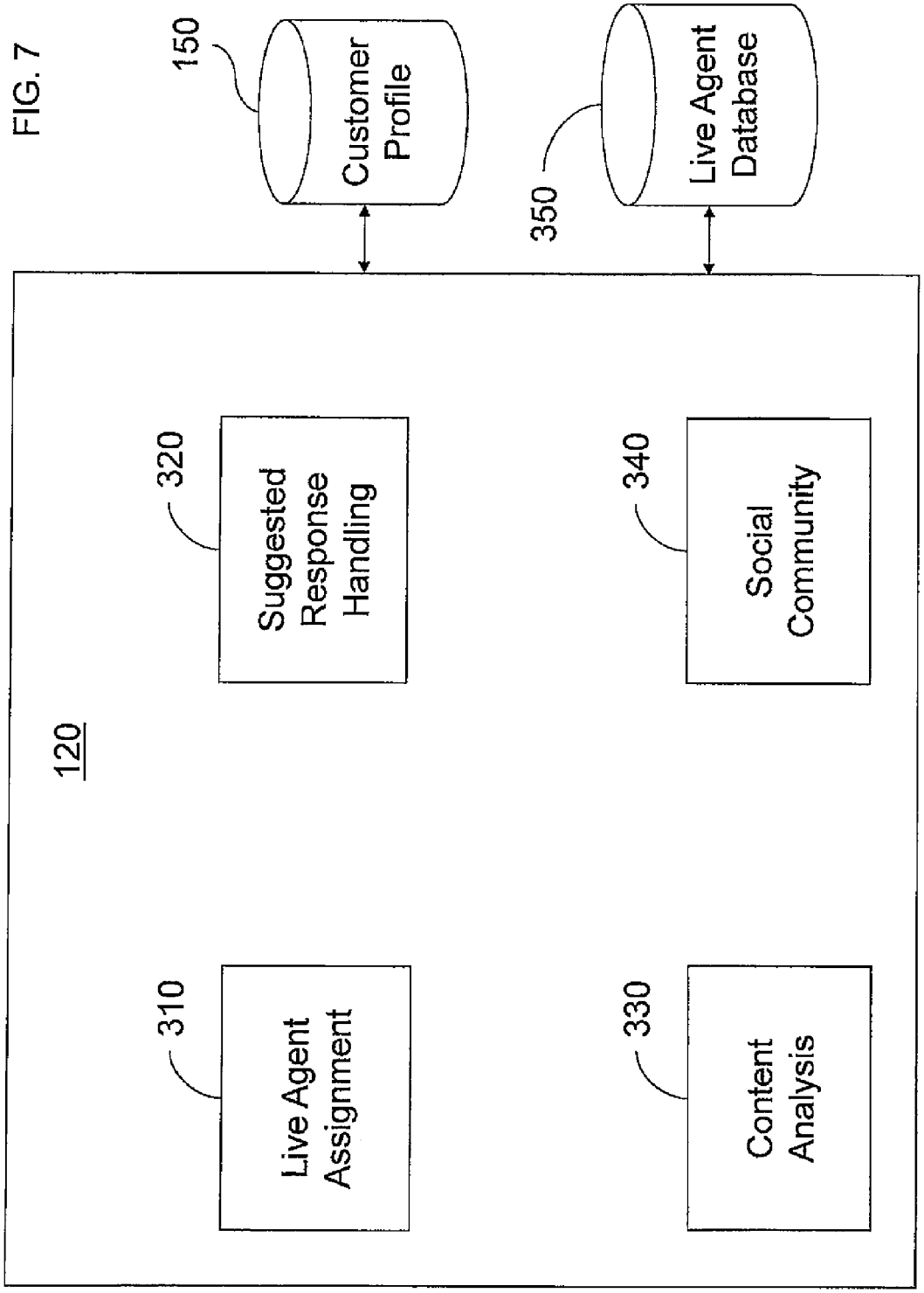
FIG. 7 is a schematic block diagram of several components of a back office services module of an intelligent automated agent according to an exemplary embodiment of the present invention.

FIG. 7 is a schematic block diagram of several components of a back office services module (such as the back office services module 120 of FIG. 2) of an intelligent automated agent according to an exemplary embodiment of the present invention. The back office services module 120 of FIG. 7 is for providing automated tuning of interaction management to a specific customer's needs. In one embodiment for a contact center, the customer interaction may be handled by two entities: a front office portion (such as the customer portal module 110) that handles the direct communication with the customer, and a back office portion (such as the back office services module 120) that handles the interaction management (for example, live agent selection, resource allocation) with the customer. The contact center, for example, may have their own personalization or customization for interacting with customers.

In a traditional contact center, the front office portion and the back office portion may be handled by live agents. In an exemplary embodiment of the present invention, some or all of the front office portion is handled by the customer portal module 110 of an automated agent, while some or all of the back office portion is handled by the back office services module 120 of the automated agent. In one embodiment, the back office services module 120 may include, for example, a live agent assignment module 310 for matching an appropriate live agent with the customer (by using a live agent database 350), a suggested response handling module 320 for checking suggested responses or response handling options against the customer profile 150, a content analysis module 330 for analyzing the content of the customer's interactions in light of the customer profile 150, and a social community module 340 for organizing customers into social communities.

According to one embodiment, the live agent assignment module 310 is responsible for assigning an appropriate live agent (such as the most appropriate live agent) to the customer for the particular problem at hand. While the cost of live agents in a contact center may be high, and the goal of the contact center may be to replace all or most live agents in the contact center with an automated agent, another scenario may be the retaining of fewer, more specialized live agents in the contact center together the live agent assignment module 310 for directing the customer to the most appropriate live agent (for example, when the customer portal module 110 no longer appears to be making satisfactory progress towards a solution for the customer's problem). Live agent handling may be appropriate, for example, when the customer prefers interacting with live agents (e.g., as indicated in the customer profile 150), or the customer has contracted to have live agent support, or the nature of the customer's problem does not seems amenable to an automated agent response.

When the live agent assignment module 310 determines to assign a live agent to the customer, the live agent assignment module 310 may consider a number of factors, such as the customer's preferences (e.g., a live agent's hard skills or soft skills, the customer's current mood or emotions, previous live agent experience, etc.), available live agents, the customer's service level agreement, etc. To this end, the live agent assignment module 310 may search the live agent database 350, which may contain biographical information on all the (possibly available) live agents. The customer may have preferred agents or types of agents to interact with, as may be determined from experience or as specified by the customer, which may be stored into and retrieved from the customer profile 150 by the live agent assignment module 310 or other components (such as the personalized IVR module 220). By way of example, in one embodiment, when the customer's current mood appears to be agitated or hostile, the live agent assignment module 310 may assign the customer to a live agent identified in the live agent database 350 as having good anger management or conflict management skills.

In one embodiment, the suggested response handling module 320 may check suggested responses or response handling options against the customer profile 150. While the customer portal module 110 may provide the responses to the customer, it may have a choice of responses, or it may have a proposed response. The suggested response handling module 320 may check the response or responses against the customer profile 150 and delete or alter responses that the customer profile 150 indicates would not be appropriate. For example, responses that have already been supplied to the customer and for which the customer has indicated are not effective may not be supplied any further to the customer.

The suggested response handling module 320 may also check the customer profile 150 for deciding the best way to address a customer concern. For example, the customer profile 150 may represent data collected over time (e.g., as based on a pre-defined algorithm), and may contain information such as pending requests not completed, customer service level status, business data, past interactions, preferred options, mood information, etc. Every time the customer contacts the contact center, the profile data in the customer profile 150 may be considered in handling the next request by the customer, for example, whether the request should be handled by the automated agent or sent to the best qualified live agent (where "best qualified" may be determined, for instance, by the automated agent).

For example, in one embodiment, the suggested response handling module 320 may assist in identifying or handling opportunities for personalized cross-/up-sales, such as opportunities to make a cross-sale of a related good or service to the customer, or to make an up-sale (e.g., increased sale) of a particular good or service desired by the customer. For instance, when receiving an inbound interaction from a given customer, the suggested response handling module 320 may first analyze whether there are cross-/up-sell opportunities for this customer, and the likelihood of the customer's acceptance (e.g., after analyzing the current interaction and/or reviewing the customer profile 150).

If the outcome of the cross-/up-sell analysis seems sufficiently positive or receptive, the suggested response handling module 320 may search for the best live agent for handling both the customer's primary need (e.g., the particular product or service request of the interaction) and at the same time handling the cross-/up-sale offer (for example, using the live agent assignment module 310). This may involve further personalization such as a good fit of the live agent to the customer's preferences.

In one embodiment, the content analysis module 330 may analyze the content of the customer's interactions in light of the customer profile 150. For example, the customer profile content (e.g., voice or video recordings, chats, collected information, etc.) may be analyzed (for instance, with a pre-defined algorithm) by the content analysis module 330 for particular information (such as particular words, expressions, behaviors) during interactions with the contact center. The customer profile 150 may then be updated by the content analysis.

At some point, the content analysis module 330 (for example, an algorithm in the content analysis module 330) may be enhanced (e.g., to search for new information in the customer profile content). In one embodiment, the automated agent may run the enhanced content analysis module 330 on all of the existing customer profile content, updating the customer profiles 150 in the process. This way, when an existing customer contacts the contact center again, the customer profile 150 for this customer will reflect the updates from the enhanced content analysis module 330. Thus, in the next interaction between the customer and the contact center, the latest profile content update (e.g., version) is considered for decisions (such as routing the customer to the appropriate resource) by the automated agent. For example, the updating of the customer profiles 150 by the enhanced content analysis module 330 may take place as background processing when computing resources are available.

In one embodiment, the content analysis module 330 uses dedicated models for different customer profiles. For example, customers fitting one particular customer profile may use a different model (for example, different rules) of content analysis module 330 for performing their customer profile content analysis. In another embodiment, the content analysis module 330 may use a different model for each individual customer. For example, a core model or customer profile model could be enhanced by dynamically adding additional customer specific rules.

In one embodiment, the social community module 340 may organize customers (for example, who share common concerns as revealed by their customer profiles) into an online social community. These communities, for example, may be somewhat small (e.g., to increase interest in participation and allow the group to be more highly specialized in a particular aspect or common goal) and take advantage of customer's natural tendencies to socialize as well as to share information with those in similar situations (for instance, in forums). By leveraging the vast amount of customer profile data, for example, sponsoring enterprises may use the automated agent to build seemingly diverse groups of customers who may be experts in particular areas important to the enterprises (e.g., based on the customers interactions with the enterprises' contact centers and automated agents).

Figure 8:
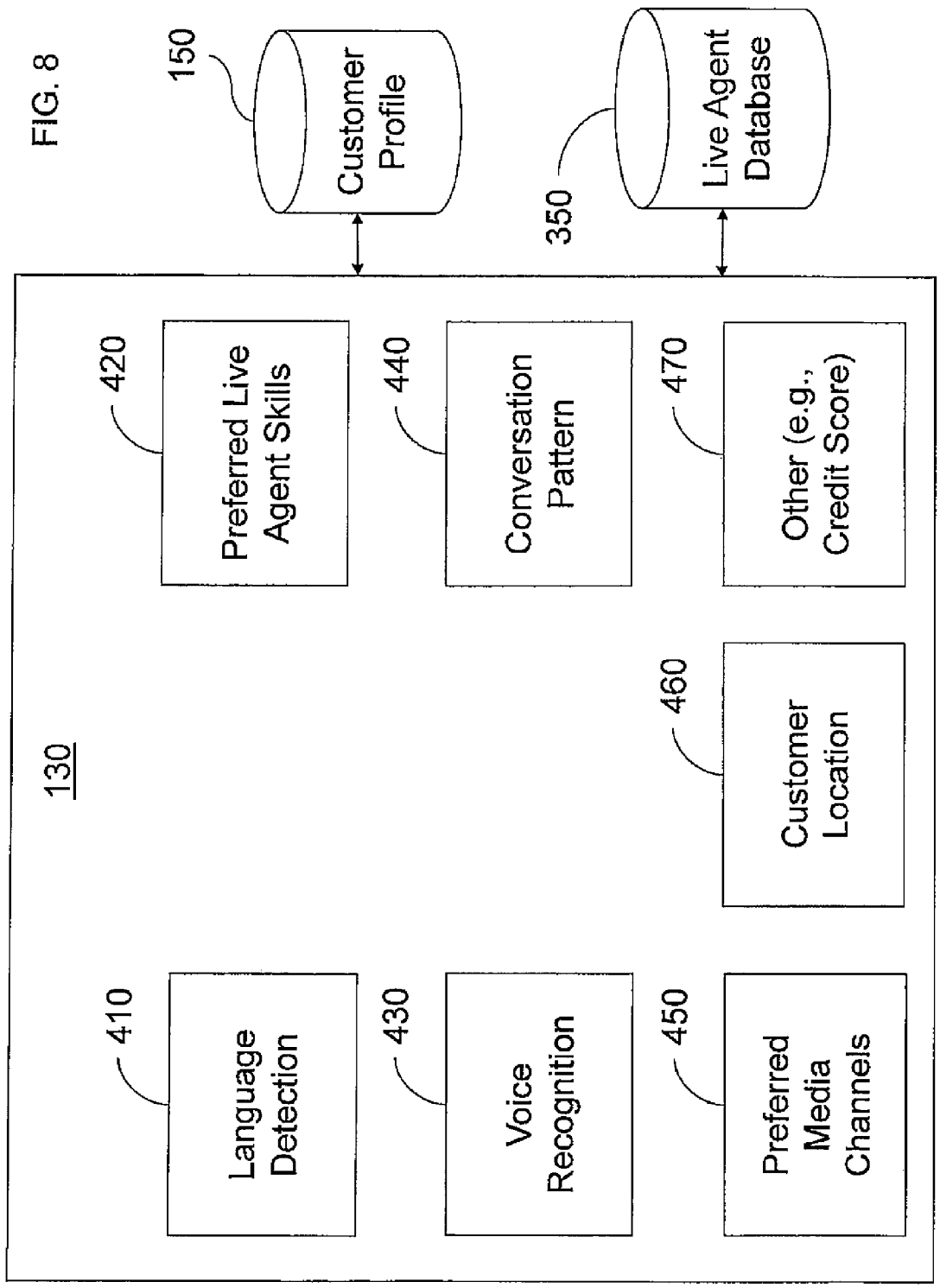
FIG. 8 is a schematic block diagram of several components of a customer directory module of an intelligent automated agent according to an exemplary embodiment of the present invention.

FIG. 8 is a schematic block diagram of several components of a customer directory module (such as the customer directory module 130 of FIG. 2) of an intelligent automated agent according to an exemplary embodiment of the present invention. The customer directory module 130 of FIG. 8 is for collecting and maintaining information on individual customers with relevance to services of the contact center, and storing this information in the appropriate customer profile 150. This information may include, for example, preferred language (spoken and/or written) as well as any other languages, preferred live agent soft skills, voice samples (as reference for authentication via voice recognition and verification), conversation pattern (for mood/sentiment detection/analysis), preferred media channels, current location (e.g., work, home, traveling), and/or the customer's credit score (if the customer is willing to share).

For example, in one embodiment, the customer directory module 130 uses a language detection module 410 to ascertain which language (spoken or written) is being communicated from the customer. For instance, the language detection module 410 may analyze communication samples from the customer (spoken or written) to detect the language, comparing the samples to known patterns of languages. The language detection module 410 may then store or update the information in the customer profile 150 to reflect this determination. The language detection module 410 may also use the customer profile 150 to help determine the language. For example, the customer profile 150 may maintain a list of languages used by the customer, with further refinement by preference, type of communication, etc.

In one embodiment, the customer directory module 130 has a preferred live agent skills module 420 for determining which skills of live agents, such as soft skills, are preferred by or effective with the customer. The preferred live agent skills module 420, for example, may use outputs from the customer emotion and mood detection module 230 to determine which soft skills in a live agent would be a good match for the customer. The preferred live agent skills module 420 may also use feedback from existing interactions with live agents and those live agents' skills (as may be maintained, for example, in the live agent database 350) to determine preferred live agent skills for the customer.

In one embodiment, the customer directory module 130 has a voice recognition module 430 for recognizing, identifying, and/or verifying the voice pattern of the customer. The voice recognition module, for example, may use voice samples from the Customer collected over time and stored in the customer profile 150 to determine the identity of the customer during interactions, or to verify the identity of the customer (such as with fraud detection), etc. Such voice samples, for example, may be collected after verifying identity through other methods (such as security questions or passwords), and may be collected specifically for later recognition purposes (such as by providing specific voice samples as part of an interaction) or may be collected over time from regular interactions with the contact center.

In one embodiment, the customer directory module 130 has a conversation pattern module 440 for detecting the conversation pattern of the customer. For example, the conversation pattern module 440 may detect if the customer is talking quickly or slowly, clearly or not clearly, etc. To this end, the conversation pattern module 440 may provide input to the customer emotion and mood detection module 230 to help in determining the customer's moods, sentiments, etc. The conversation pattern may be stored in the customer profile 150 for developing a more complete picture of the customer (for example, saving multiple conversation patterns over multiple interactions). The conversation pattern module 440 may detect the conversation pattern of the customer during conversations with automated agents or with live agents.

In one embodiment, the customer directory module 130 has a preferred media channels module 450 for determining the preferred media channels of the customer. This information may be stored, for example, in the customer profile 150: The preferred media channels module 450 may use, for example, information from the existing interactions between the customer and the contact center to determine the preferred media channels of the customer. For example, the customer may always (or almost always) use a particular media channel, such as e-mail or smartphone, to contact the contact center. Information about the particular media channel, such as phone number, type of smartphone, type of e-mail (e.g., plain text, rich HTML), etc., may also be stored in the customer profile 150 to further assist, for example, with exploiting whatever features or accommodating for any limitations that are inherent in the preferred media channels of the customer. In one embodiment, the preferred media channels module 450 may obtain the preferred media channels of the customer by directly asking the customer.

In one embodiment, the customer directory module 130 has a customer location module 460 for determining the location of the customer. The customer location module 460 may determine, for example, if the customer is at work, at home, or travelling (e.g., in a different state or country, or in a different part of the same town or city of the customer's work or home). The customer location module 460, may use the phone number that the customer is using to contact the contact center (for example, a phone call), or the IP address of the customer's computer (for example, a live chat), or the GPS tracking information (for example, a smartphone interaction) to pinpoint a customer's location. The customer's location may be useful, for example, for building the customer profile 150 of the customer, to determine the customer's preferred media channels and under what circumstances, to assist the customer with a particular problem (such as if the customer needs live help at their current location), etc.

In one embodiment, still other modules 470 may be part of the customer directory module 130. For example, in one embodiment, the other modules 470 may include a module for determining a customer's credit score. For instance, the credit score module 470 may obtain the customer's permission to obtain their credit score. The credit score module 470 may, for example, obtain the necessary information to obtain the credit score (e.g., legal name, social security number, etc.) by asking the customer directly or by searching the customer profile 150. The credit score module 470 may then use this information to contact a credit score reporting bureau (for example, over the Internet), supply the appropriate input information, fee, and whatever further inputs are needed to obtain the credit score of the customer, and then obtain the credit score. The credit score may be useful, for example, in determining what programs or services are available to the customer, providing a credit risk of the customer, etc.

Figure 9:
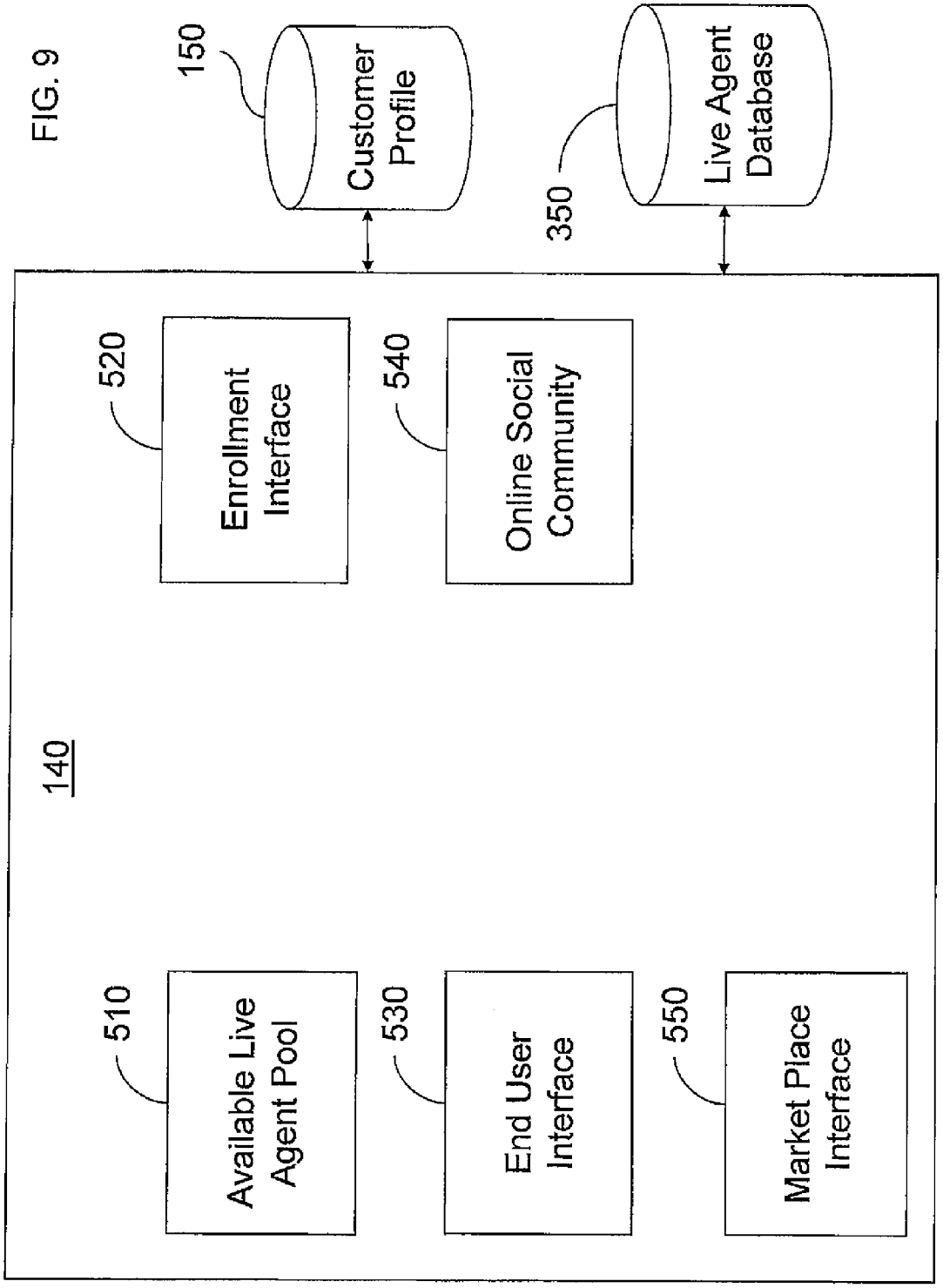
FIG. 9 is a schematic block diagram of several components of a live agent pool administration module of an intelligent automated agent according to an exemplary embodiment of the present invention.

FIG. 9 is a schematic block diagram of several components of a live agent pool administration module (such as the live agent pool administration module 140 of FIG. 2) of an intelligent automated agent according to an exemplary embodiment of the present invention. The live agent pool administration module 140 of FIG. 9 may be for administration of a dynamically assembled pool of live agents (as may be selected from the live agent database 350) who will be assigned work for a given enterprise. The live agent pool administration module 140 may also oversee routing of interactions to this live agent pool. The live agent pool administration module 140 may work in real-time, automatically assigning live agents to incoming or outgoing contacts or customers on demand.

In one embodiment, the live agent pool administration module 140 contains an available live agent pool module 510 for overseeing a pool of available live agents for the enterprise. These agents may be selected from the live agent database 350 and may, for example, be employed by or assigned to a particular enterprise based on the enterprise's arrangement (for example, own, lease, outsource, contract) with the contact center. The pool may include those agents currently "on duty" (e.g., at work and able to handle customer interactions), which may be further broken down, for example, by free or busy (depending on factors, such as whether a particular agent is currently assisting another customer in an exclusive interaction or is otherwise not available). The live agent pool is dynamic, continually adjusting depending on the circumstances. For example, in one embodiment, the live agent pool represents experts in a particular area, such as tax advisors with appropriate certification, offering their services, for instance, for tax preparation. Customers may engage the services of these experts by contacting the contact center.

In one embodiment, the live agent pool administration module 140 may have an enrollment interface module 520 where experts may specify, for example, their profile, potentially with proof of certification, their hours of service, and their fees. The enrollment interface module 520 collects the necessary information (for example, though an online GUI) from a prospective expert. Upon acceptance into the pool of live agents (for example, online experts may be selected based upon pre-defined criteria, such as acceptable proof of certification, availability, and rates that meet the requirements of the organization setting up the pool), the prospective expert's profile information is added to the live agent database 350.

In other embodiments, experts may be accepted into the pool of live agents in different ways. For example, experts may be chosen by administrative assignment, or by competitive bidding (with admission after checking compliance with criteria such as required skills or necessary certifications). When the expert is available to answer customer contacts, the live agent pool administration module 140 may assign the expert to the available live agent pool 510, where the expert is assigned to customers as needed.

For example, in one embodiment, prospective customers of the experts (e.g., taxpayers in need of help for tax preparation) would be presented with an interface via an end user interface module 530. The end user interface module 530 exposes the expert's service to end users, for example, though a web interface or through an 800 number type call service. The service may also be operated as an add-on service by companies selling tax preparation products (such as computer tax preparation products). The live agent pool administration module 140 may also interact with the other components of the intelligent agent (for example, the customer portal module 110, the back office services module 120, or the customer directory module 130) to facilitate operations and take advantage of the services of these components.

In one embodiment, the live agent pool administration module 140 maintains contact information of members of an online social community through an online social community module 540. This may be a less formal interface, where prospective "experts" in, for example, an online social community (such as an online forum) may be invited by or may solicit the online social community module 540 to act as "virtual agents," to assist other users. These virtual agents may have specialized knowledge, advanced expertise, or significant experience (for example, they may be experts in shoes or other retail products, such as on-line retail products), as demonstrated, for instance, in their online social community activity. Such virtual agents may help advise others in a more personal and efficient manner than an online community through an interface similar to the expert live agents enterprise managed by the available live agent pool module 510, the enrollment interface module 520, and the end user interface module 530.

In one embodiment, the online social community module 540 employs the same or similar modules to the available live agent pool module 510, the enrollment interface module 520, and the end user interface module 530. These interfaces may be simplified, in that the virtual agents may not be working as employees or contractors of an enterprise, and the customers seeking help may be looking for free advice, but the concepts of "agent availability" and matching of customers to virtual agents are similar and may exploit the same or similar modules. For example, in one embodiment, the profiles of the virtual agents are maintained in the same live agent database 350 as the regular live agents. The virtual agents could be available for shifts as a temporary assignment.

The virtual agents may work in this capacity for various reasons, for example, pro bono, altruism, obtain experience as a contact center agent (which could lead, for example, to a paid position as a contact center live agent for an enterprise), discounts on products (for example, shoes) for which they help provide advice, etc. For example, in one embodiment, such virtual agents are tracked by the same or similar tools to tracking live agents, which may help maintain a level of consistency and quality for customers and help the virtual agents demonstrate their skills in ways that may be observed and appreciated by others.

In one embodiment, the online social community module 540 determines the number of virtual agents depending on business type and scope as well as the community conversation. For example, some business types, such as automobiles, may require more expertise (which could lead to a need for more virtual agents) than other business types, such as toothpaste. The online social community module 540, for example, may examine online community conversation for the number of questions in addition to the length and number of corresponding answers to gauge how much activity there is and how much need there is for virtual agents.

In one embodiment, the live agent pool administration module 140 operates a market place for contact center services through a market place interface module 550. For example, the market place interface module 550 may offer business process outsourcing. In one embodiment, the market place interface module 550 publishes demand for contact center services on an on-line marketplace (for example, on a web page). In response to these demand, contact center service providers may use the market place interface module 550 (for example, via the web page interface) to submit their bids for providing the contact center services.

In response to these bids, the market place interface module 550 may select from these offered bids by considering many factors, such as the actual demand, the service fees, the bidders' reputation, etc. For example, the market place interface module 550 may use pre-defined criteria, such as the bid, the previous experiences between the bidder and the market place interface module 550 (e.g., successful or unsuccessful bids, customer feedback from customers of the outsourcing), etc., in selecting a contact center services provider to award the bid. In one embodiment, the automated agent may administer the auction of different contact centers' offerings and find the best match for the collaborating group based on such pre-defined criteria.

Figure 10:
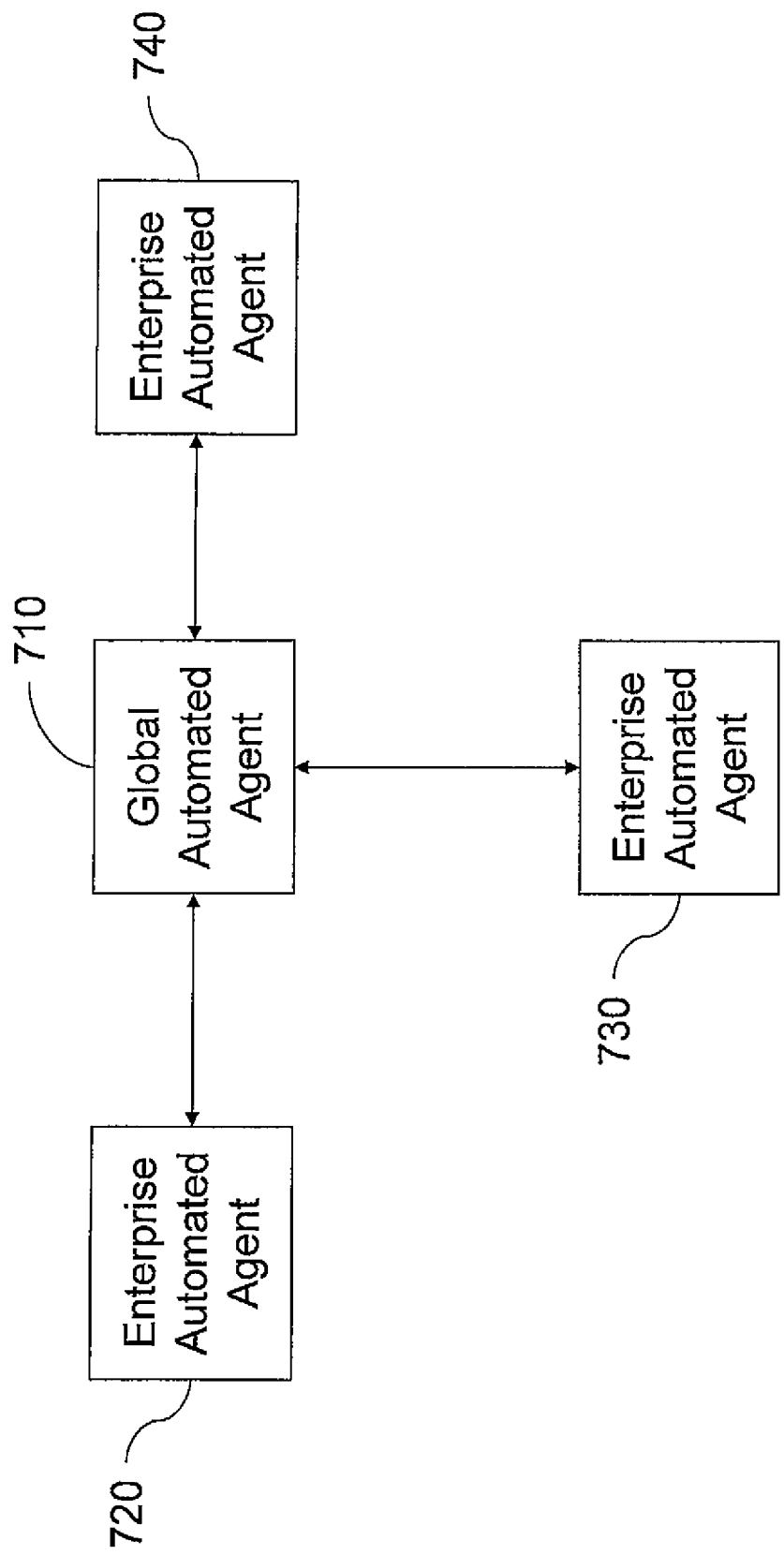
FIG. 10 is a schematic block diagram of a deployment architecture option for an intelligent automated agent according to one exemplary embodiment of the present invention.

FIG. 10 is a schematic block diagram of deployment architecture option for an intelligent automated agent according to one exemplary embodiment of the present invention. In one embodiment, the intelligent automated agent may be instantiated at the enterprise level, such as enterprise automated agents 720, 730, and 740. Each enterprise automated agent, using enterprise automated agent 720 as an example, may be responsible for the automated agent functions of an entire enterprise. For example, enterprise automated agent 720 could maintain the customer profiles 150 and live agent database 350 of every customer and live agent associated with one or more contact centers for the enterprise. The enterprise automated agent 720 may be further customized (such as being rebranded) depending on the desires or requirements of the enterprise.

In one embodiment, the intelligent automated agent may be instantiated at a more global level, such as global automated agent 710, which oversees numerous enterprise automated agents, such as enterprise automated agents 720, 730, and 740. For example, in one embodiment, the global automated agent 710 may observe and have access to all activity in the subordinate enterprise automated agents 720, 730, and 740. For instance, the global automated agent 710 may be able to access each of the enterprise automated agent's (using enterprise automated agent 720 as a representative enterprise automated agent) customer profiles 150, live agent database 350, etc. (which may be generally called "databases" hereinafter). In one embodiment, the global automated agent 710 merges and consolidates the databases from the separate enterprise automated agents underneath. In this fashion, deeper customer profiles, live agent databases, and other databases and functions are available at the global automated agent 710 level.

This merger and consolidation of enterprise automated agent level data may take place, for example, by replicating the enterprise automated agent data at the global automated agent, or by maintaining pointers to each of the respective enterprise automated agent level database entries (and doing the merger and consolidation of the pointers at the global automated agent 710) when the same entity (e.g., customer, live agent, etc.) is identified at multiple enterprise automated agents, as would be apparent to one of ordinary skill in the art. In one embodiment, the sharing of certain enterprise automated agent data may be restricted for confidentiality reasons between the enterprises.

For example, enterprise automated agents 720 and 730 may be working on behalf of banks (say, Bank A and Bank B, respectively) while enterprise automated agent 740 may be working on behalf an airline (say, Airline C). A longstanding customer of Bank A may approach Bank B for some business purpose. Some or all of the customer profile data obtained by Bank A for the customer may be of interest to Bank B. While enterprise automated agent 720 (for Bank A) may not interact directly with enterprise automated agent 730 (for Bank B), the two enterprise automated agents are connected through the global automated agent 710, which may exchange the customer information between enterprise automated agent 720 and enterprise automated agent 730 (subject, for example, to an agreement between Bank A and Bank B on what information may be shared via the global automated agent 710).

Continuing with this example, Airline C may be doing a business transaction with someone pretending to be the longstanding customer of Bank A. While enterprise automated agent 720 (for Bank A) and enterprise automated agent 740 (for Airline C) do not interact directly, they do share the global automated agent 710, which may employ fraud detection information for the longstanding customer acquired by enterprise automated agent 720 to block the transaction with enterprise automated agent 740.

Figure 11:
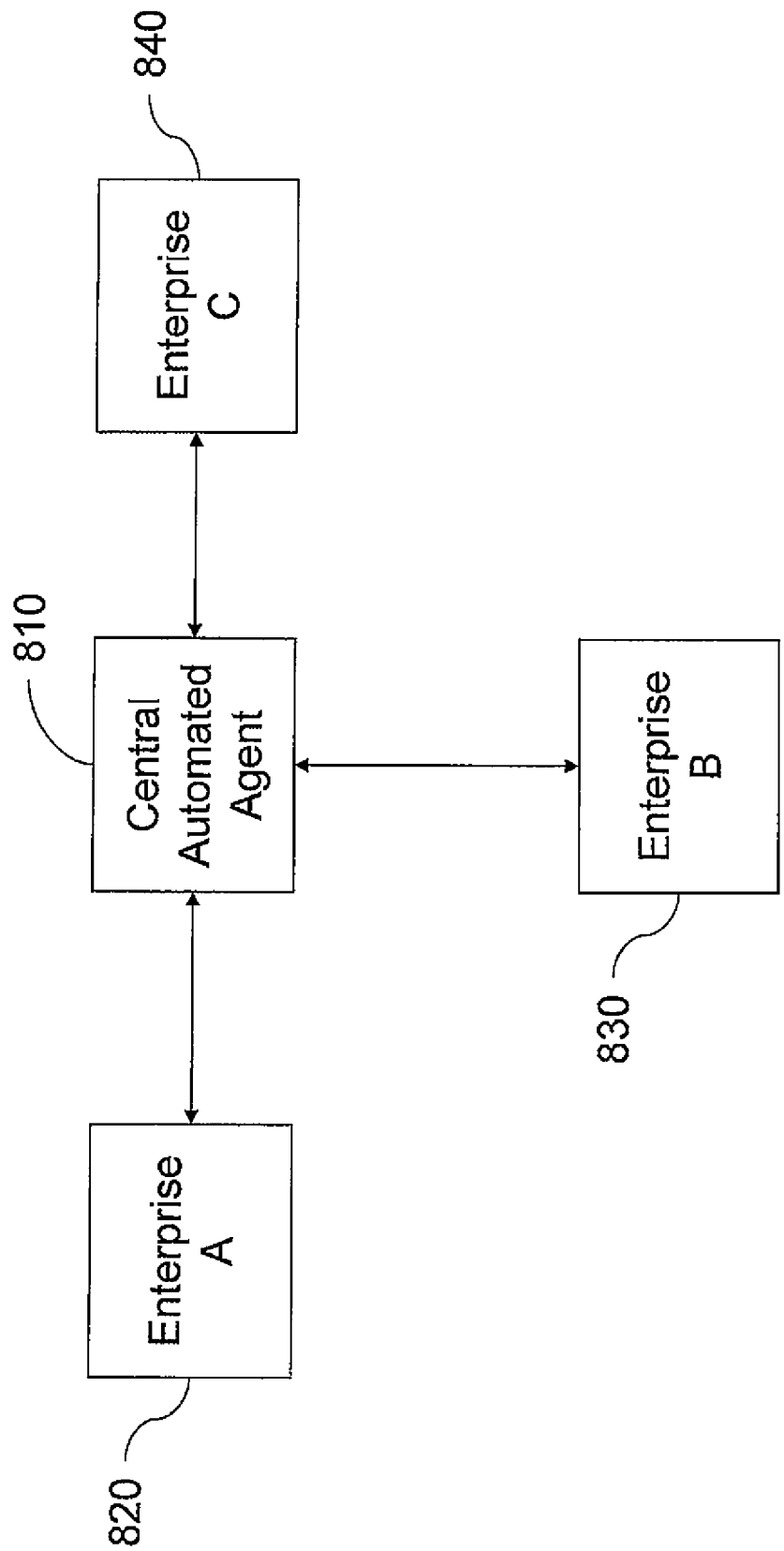
FIG. 11 is a schematic block diagram of another deployment architecture option for an intelligent automated agent according to one exemplary embodiment of the present invention.

FIG. 11 is a schematic block diagram of another deployment architecture option for an intelligent automated agent according to one exemplary embodiment of the present invention. In the automated agent architecture of FIG. 11, there is a centralized automated agent 810 that provides contact center support for three different enterprises 820, 830, and 840 (namely, enterprise A, enterprise B, and enterprise C, respectively). This type of architecture may be appropriate, for example, in a SaaS (software as a service, such as with cloud computing) model, where the individual enterprises share a common resource, in this case a central automated agent 810. The central automated agent 810, for example, may share common databases (e.g., customer profiles, live agents) across all three enterprises 820, 830, and 840, or may logically partition such databases across each of the separate enterprises, as would be apparent to one of ordinary skill in the art. Such a decision may depend, for example, on factors such as the relationship between the different enterprises (e.g., direct competitors may insist on having more logical separation of the databases).

For example, the central automated agent 810 may provide a central entry point to the contact centers of a set of subscribed businesses (for example, enterprises A, B, and C). A customer of any one of these businesses and who uses or is familiar with the interface of the central automated agent 810 may then be familiar with the interface for the other subscribed businesses. Further, information (for example, contact information) shared between the different businesses (as facilitated by the shared central automated agent 810) may only have to be provided once by the customer and would then be available to all of the subscribed businesses. This may lead to increased efficiency (e.g., avoiding duplication of effort), accuracy, and consistency of interactions between customers and the enterprises compared to, for example, each enterprise obtaining the same or similar information separately or with different interfaces.

Figure 12:
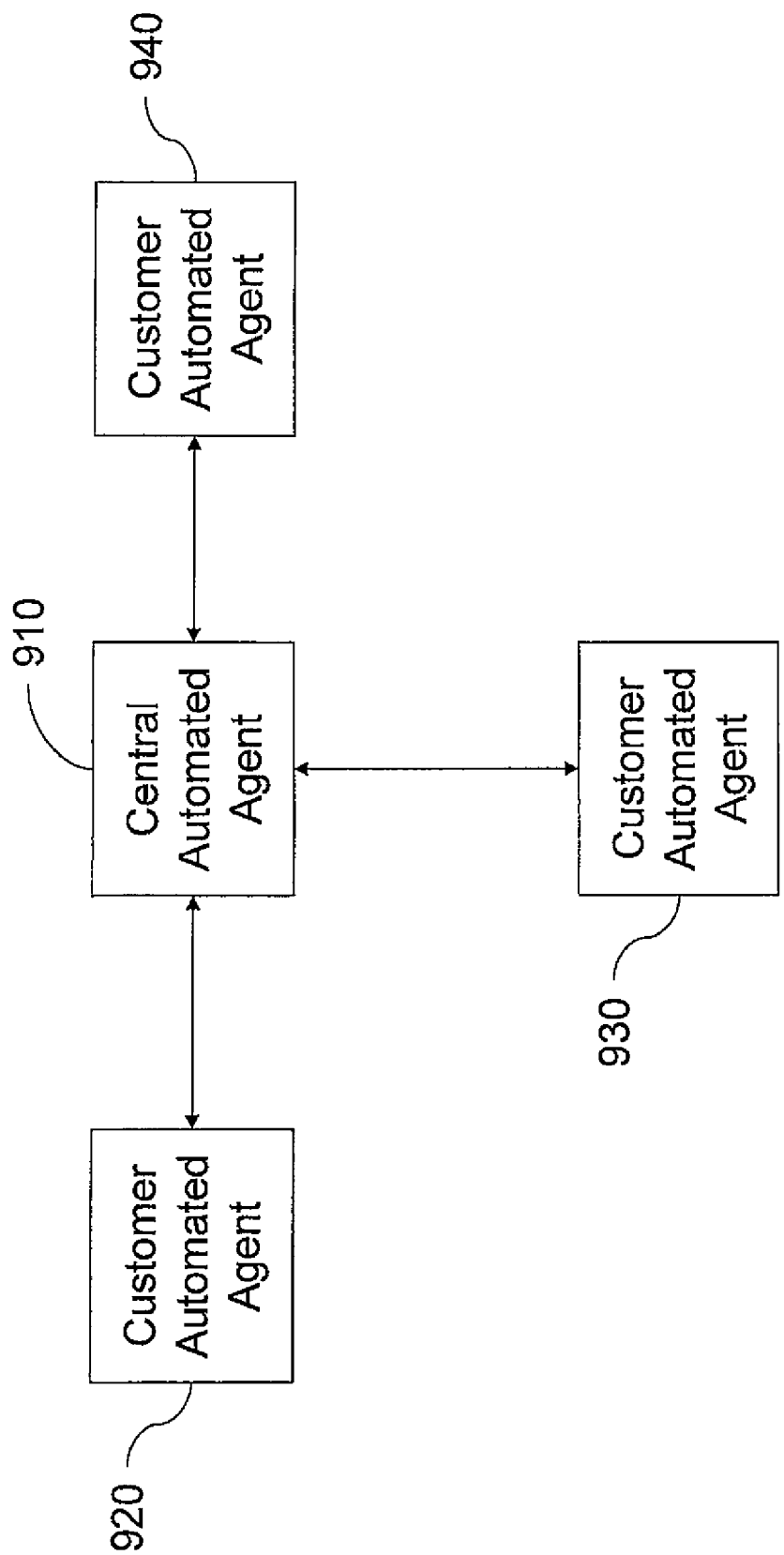
FIG. 12 is a schematic block diagram of yet another deployment architecture option for an intelligent automated agent according to one exemplary embodiment of the present invention.

FIG. 12 is a schematic block diagram of yet another deployment architecture option for an intelligent automated agent according to one exemplary embodiment of the present invention. In the automated agent architecture of FIG. 12, there is a central automated agent 910, such as an enterprise automated agent or a centralized automated agent that services multiple enterprises, that provides contact center support for three different personal (for example, customer) automated agents 920, 930, and 940. For example, there may be a customer automated agent for every customer of the one or more enterprises. In one embodiment, the customer automated agent may be an instance of an automated agent, such as for a PDA (personal digital assistant), laptop, smartphone, etc., that may be deployed at the individual customer level. For example, the customer automated agent may be an app for a smartphone. By sharing and/or distributing the central automated agent functionality and/or databases to customer automated agents, increased personalization and processing resources may be available by taking advantage of distributed and (to each customer) more localized control of the contact center functions and data provided by customer automated agents.

The customer automated agent (using customer automated agent 920 as an exemplary customer automated agent), for example, may be personalized to the particular customer (or further personalized from the interface presented by the central automated agent 910), or contain personal information (such as personal information not stored in the central automated agent 910), or provide a more efficient or offline interface to the contact center. For example, the customer automated agent 920 may maintain a customer profile similar to or the same as the customer profile 150 for that customer on the central automated agent 910.

In one embodiment, the customer automated agent 920 may be dedicated to a particular enterprise (such as a dedicated automated agent app for a smartphone, PDA, tablet computer, etc.) This may be appropriate, for example, for large enterprises that may spend the effort to develop and maintain their own automated agent app. Here, the customer automated agent 920 may work or collaborate with an enterprise automated agent 910 that is also dedicated to providing contact center services for the enterprise. In another embodiment, the customer automated agent 920 may work directly with the enterprise contact center, maintaining all of the automated agent logic and databases local to the customer automated agent 920 (and without going through, for example, an enterprise automated agent).

In one embodiment, the customer automated agent 920 may be a generic automated agent app that may serve multiple enterprises. For example, the generic automated agent app may be configured to work or collaborate with a central automated agent 910 that serves the multiple enterprises (such as the central automated agent 810 in FIG. 11). The customer using the generic automated agent app may select, for example, a particular enterprise with which to contact, which would cause enterprise specific data to be loaded on or made accessible to the customer device through the generic automated agent app. In another embodiment, the customer automated agent 920 may work directly with the different enterprises' contact centers, maintaining all of the automated agent logic and databases local to the customer automated agent 920 (and without going through, for example, a central automated agent).

In one embodiment, the customer automated agent 920 may operate in an offline mode (e.g., disconnected from the central automated agent 910). For example, the customer may update and enter data, such as personal data (e.g., change of address, ranking of particular live agents with which the customer has interacted with the enterprise contact center). This personal data may then be submitted to the contact center, for example, when the customer automated agent 920 is offline with (for example, interacts with) the central automated agent 910, at which point the central automated agent 910 may consider the data in deciding how to handle future interactions with the customer.

In one embodiment, the customer automated agent 920 may communicate the customer's status to the contact center. For example, the customer automated agent 920 may let the contact center know (e.g., through the central automated agent 910) whether the customer may be contacted by a live agent (e.g., passive availability) or whether the customer would like to talk to a live agent at a time convenient to the contact center (e.g., an active conversation request). This and other personalized data may be submitted through the customer automated agent 920 to the given contact center (e.g., through the central automated agent 910) for consideration in future interactions.

In one embodiment, the customer automated agent 920 may synchronize with the contact center (e.g., with the central automated agent 910) periodically and update each other's databases (such as the customer profile 150) accordingly. For instance, the customer may have new contact data (such as a change of address) to share with the contact center while the contact center may have a new business opportunity to share with the customer. This may provide for a more efficient way to communicate (or update) customer profile information between the customer and the contact center (versus, for example, having the central automated agent 910 request the data from the customer during the various interactions that the customer has with the contact center). It may also improve accuracy of content of such information (since the customer may have easier or more direct access to the customer profile data through their customer automated agent 920 than through the interfaces with the central automated agent 910). For example, such synchronization may allow faster and more accurate updating of contact data between the customer and the contact center, or timelier or more effective delivery of new business offerings or promotions from the contact center to the customer.

Figure 13:
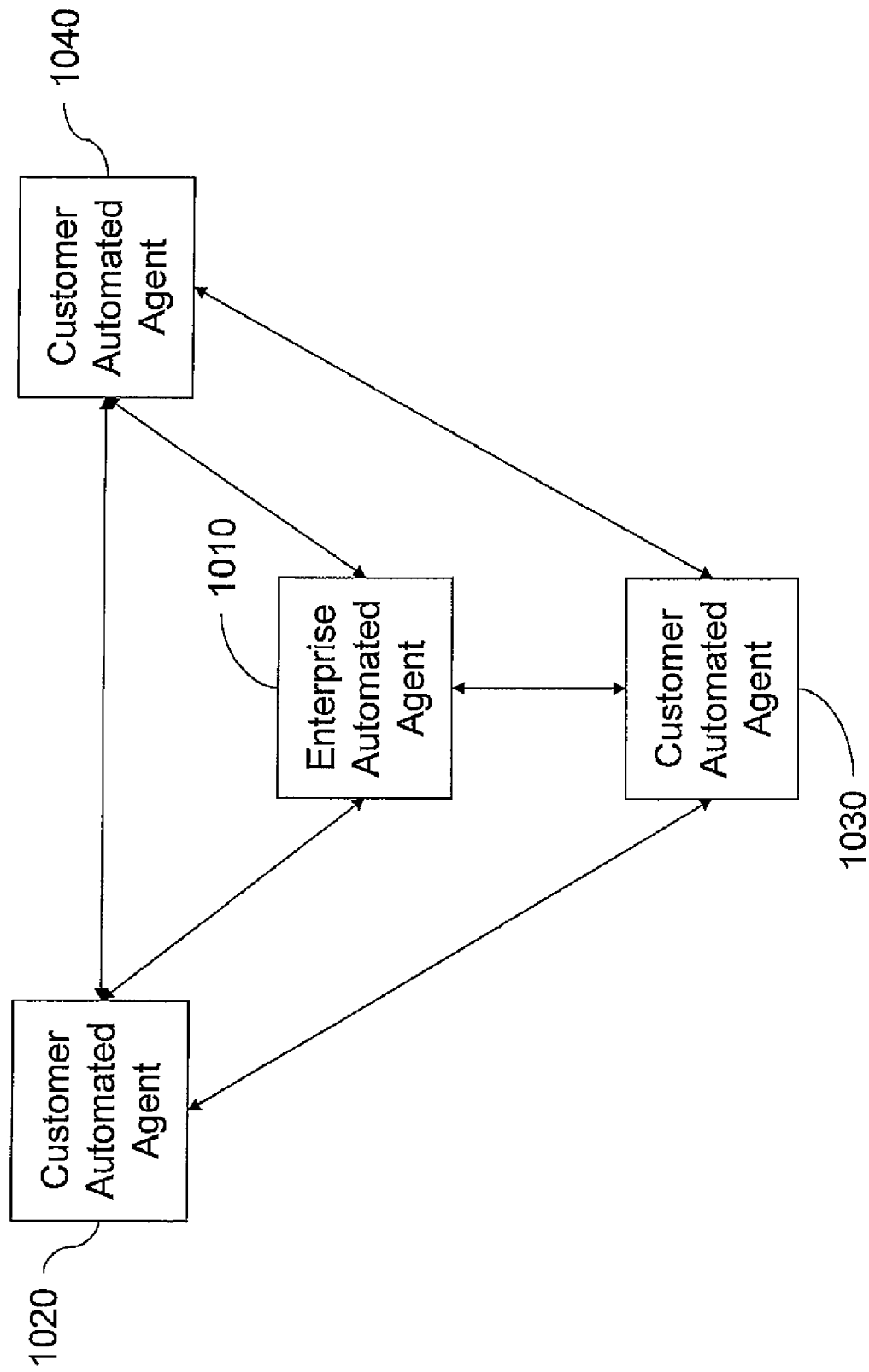
FIG. 13 is a schematic block diagram of still yet another deployment architecture option for an intelligent automated agent according to one exemplary embodiment of the present invention.

FIG. 13 is a schematic block diagram of still yet another deployment architecture option for an intelligent automated agent according to one exemplary embodiment of the present invention. In the automated agent architecture of FIG. 13, there is an enterprise automated agent 1010 that serves an enterprise, and that provides contact center support for three different customer automated agents 1020, 1030, and 1040. Only three customer automated agents are shown in FIG. 13 for illustrative purposes. The number of customer automated agents may be significantly larger in other embodiments. The customer automated agents 1020, 1030, and 1040 may collaborate with the enterprise automated agent 1010 or with each other. For example, in one embodiment, the customer automated agent 1020 may work or collaborate with the other customer automated agents 1030 and 1040. For instance, a group of users having a business relationship with each other (for example, through the enterprise), may use their respective customer automated agents 1020, 1030, and 1040 to organize a group event (such as a vacation outing that requires a certain number of participants and agreement on trip details).

Figure 14:
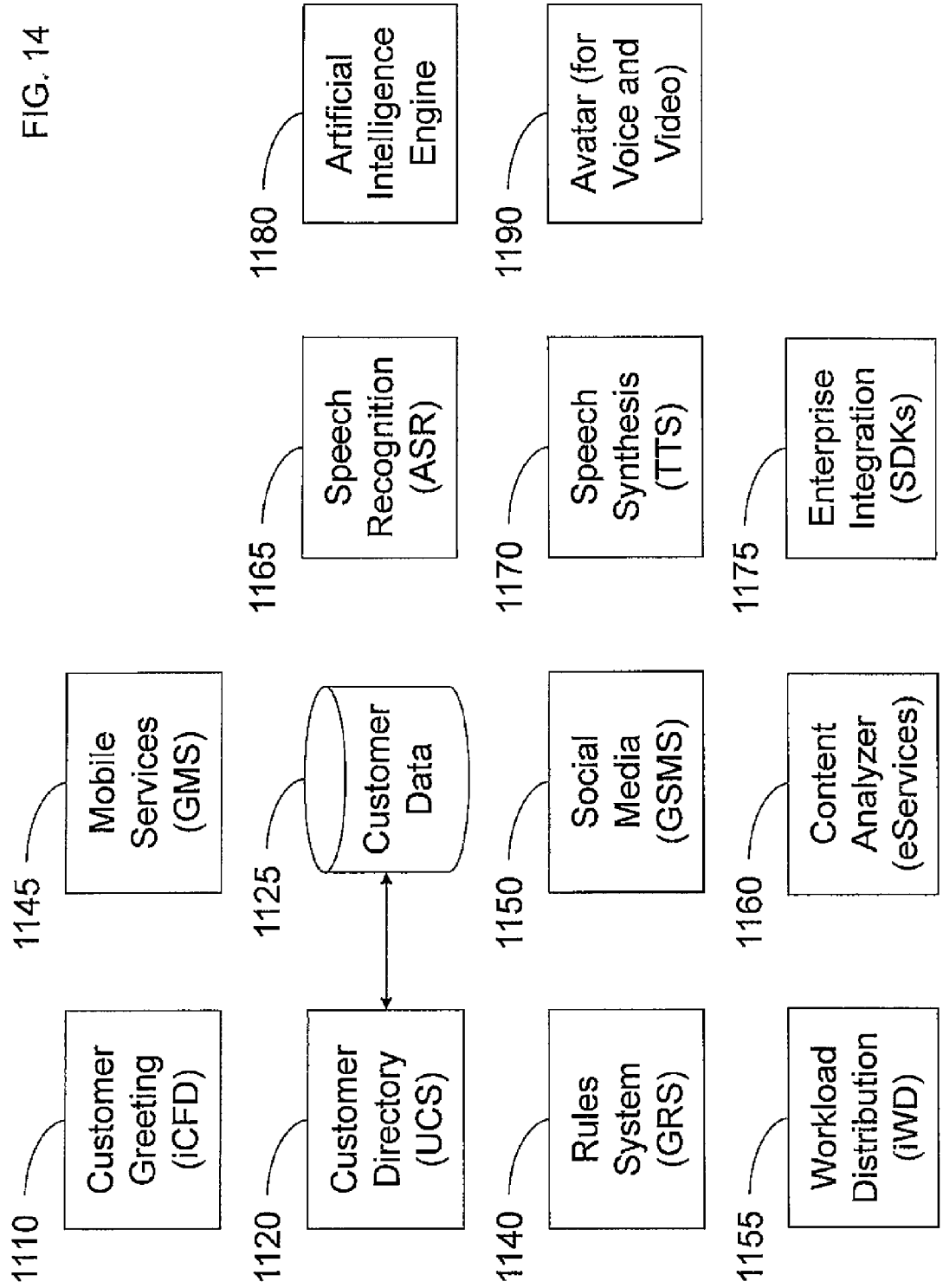
FIG. 14 is a schematic block diagram of components of an intelligent automated agent according to one exemplary embodiment of the present invention.

FIG. 14 is a schematic block diagram of components of an intelligent automated agent according to one exemplary embodiment of the present invention. For ease of description, the intelligent automated agent of FIG. 14 is described in terms of managing a contact center for an enterprise.

The intelligent automated agent of FIG. 14 may include an automated customer greeting module 1110 for greeting interactions between customers and the contact center, a customer directory module 1120 for storing and retrieving data on customers, a rules system module 1140 for developing, authoring, and evaluating business rules, a mobile services module 1145 for allowing developers to build mobile applications, a social media module 1150 for obtaining information on the customer from social media channels, a workload distribution module 1155 for distributing work tasks to the appropriate resources, a content analyzer module 1160 for analyzing the content of communications (for example, text-based communications), a speech recognition module 1165 for recognizing speech communicated to the contact center from the customer, a speech synthesis module 1170 for converting text to speech for delivery to the customer, an enterprise integration module 1175 for customizing or integrating the automated agent with existing applications of a contact center, an artificial intelligence engine module 1180 tailored to the needs of the automated agent, and an avatar module 1190 for communicating with the customers using a combination of voice and/or video channels.

The automated customer greeting module 1110 may serve as a first point of contact between a customer and the contact center. The customer greeting module 1110 may serve several functions, such as identifying the customer, identifying the reason for the interaction, and choosing a first routing of the interaction to a more appropriate component, contact, live agent, etc., depending on factors such as the nature of the interaction. In one embodiment, the automated customer greeting module 1110 may be the iCFD (intelligent Customer Front Door), available from Genesys Telecommunications Laboratories, Inc. ("Genesys"). "Genesys" and "iCFD" are trademarks of Genesys. In one exemplary embodiment, the automated customer greeting module 1110 uses iCFD with an avatar impersonation (as implemented, for example, by the avatar module 1190) for the customer to interact with in place of an IVR type interface.

iCFD is a call routing application that collects a customer's intent (based on what they say) using speech recognition, determines how to treat the call based on that input and feedback from the back-end systems, customer relations management (CRM) systems, and other data, and determines proactively where the customer should be routed and what service should be provided, whether live agent assisted, self service, or (with appropriate extensions) to an automated agent. iCFD thus manages and routes every interaction, provides a consistent experience across all channels, identifies, determines intent, and directs the customer to the right place, provides a single point of contact (such as a single phone number) to access all services, collects information from back-end systems and provides responses based on back-end inputs and events, provides a tailored customer experience, provides opportunities for cross-sell and up-sell, and provides access to any service from any service.

Figure 15:
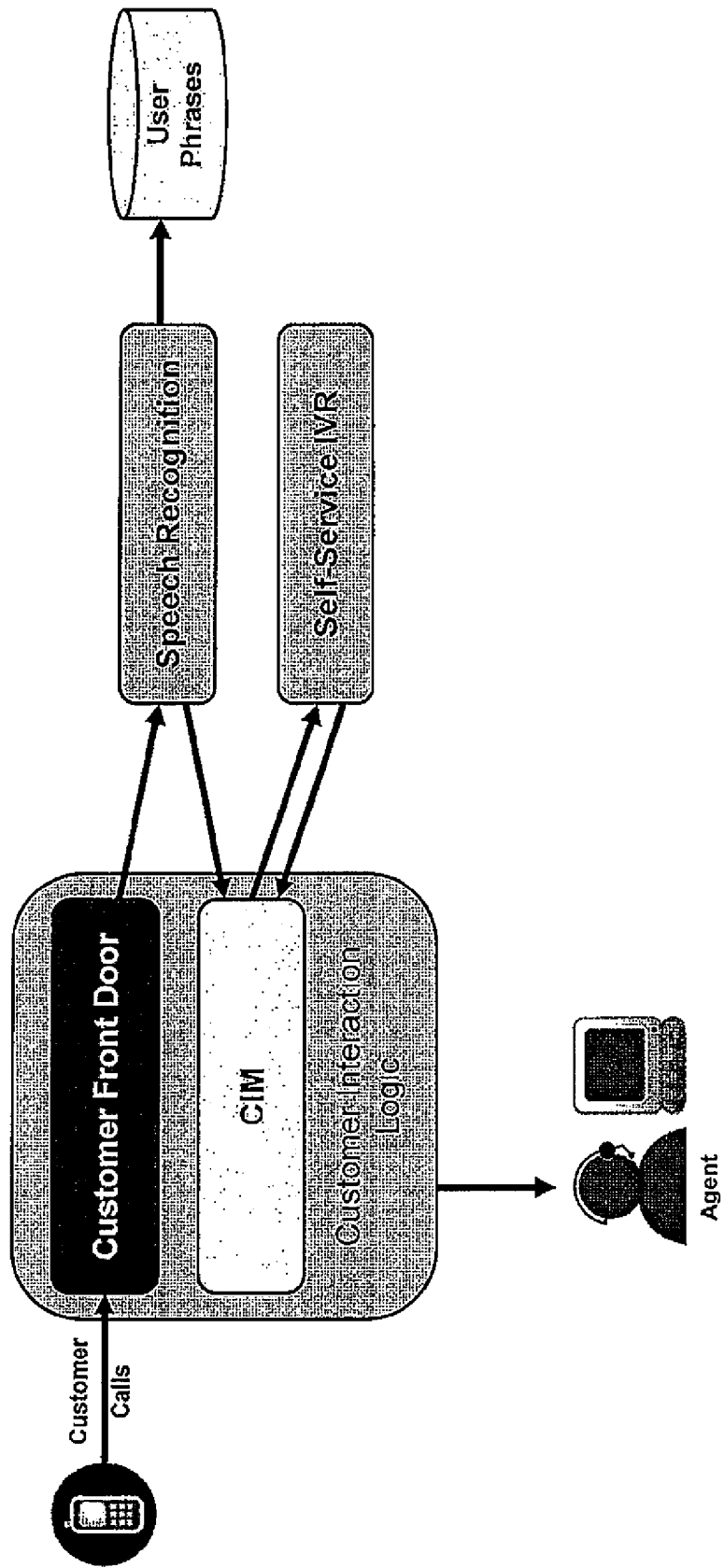
FIG. 15 illustrates an example automated customer greeting module of an intelligent automated agent according to one embodiment of the present invention.

FIG. 15 illustrates an example automated customer greeting module (such as the automated customer greeting module 1110 of FIG. 14) of an intelligent automated agent according to one embodiment of the present invention. The automated customer greeting module of FIG. 15 includes a customer interaction logic module, which includes a customer front door module and a customer interaction management (CIM) module. Further components of the automated customer greeting module of FIG. 15 include a speech recognition engine, a self-service IVR module, and a user phrases database.

An example interaction in the automated customer greeting module of FIG. 15 may be started by a customer calling the contact center and being routed to the customer front door module. The customer front door module works with the speech recognition engine to recognize what the customer wants. The phrases used by the customer during the speech recognition are saved in the user phrases database for later optimization. The interpretation of what the customer wants is sent to the CIM module. The CIM module decides where to route the caller. For example, the CIM module may route the call directly to a live agent. The CIM module may instead to route the call to the self-service IVR module.

The self service IVR module may use, for example, automated speech recognition (ASR) or dual-tone multi-frequency (DTMF) signaling (e.g., touch tones) to easily automate many possible transactions. The results of the IVR transaction may be sent back to the CIM module. For instance, the customer may have a question that cannot be addressed by the self-service IVR module, in which case the CIM module may route the customer's call to a live agent. The live agent may then get a prompt from the CIM module about the incoming call (for example, saying that the customer has just used the self-service IVR module and has a question for a live agent).

The customer directory module 1120 may store and retrieve customer data, such as in a customer data database 1130, which may be stored on a nonvolatile storage device (such as a disk drive or a cloud drive). Data on customers (for example, as acquired from interactions with the customer) may be stored and later retrieved by the customer directory module 1120. In one embodiment, the customer directory module 1120 may be for storing and retrieving customer profile data as built up, for example, through interactions between the customer and one or more contact centers. In one embodiment, the customer directory module 1120 may be the UCS (Universal Contact Server), available from Genesys.

The rules system module 1140 may be for developing, authoring, and evaluating business rules, such as in an extended markup language (XML) such as VoiceXML (VXML), an XML format for specifying interactive voice dialogues between a human and a computer and that may be interpreted by a voice browser. In one embodiment, the rules system module 1140 may be the GRS (Genesys Rules System), available from Genesys. In one embodiment, the rules system module 1140 may utilize the rules technology described in Ristock et al., U.S. patent application Ser. No. 13/689,750, "WORKLOAD DISTRIBUTION WITH RESOURCE AWARENESS," filed Nov. 29, 2012, and Ristock et al., U.S. patent application Ser. No. 13/689,753, "SYSTEM AND METHOD FOR TESTING AND DEPLOYING RULES," filed Nov. 30, 2012, the entire contents of both of which are incorporated herein by reference. In one embodiment, the rules system module 1140 may utilize the Rete algorithm (see, for example, "Rete algorithm," Wikipedia (www.wikipedia.org), as captured on Mar. 14, 2013 (last modified Feb. 26, 2013), the entire content of which is herein incorporated by reference, or may be done with other suitable rules technologies.

The mobile services module 1145 may provide services and APIs (application programming interfaces) for assisting developers create mobile applications for use with the intelligent automated agent of FIG. 14. In one embodiment, the mobile services module 1145 may be the GMS (Genesys Mobile Services), available from Genesys.

The social media module 1150 may be for obtaining information on the customer from social media channels. The social media module 1150, for example, may allow the customer to interact with the contact center by going through the social media (such as a social networking site like Facebook). The social media module 1150 may also obtain customer profile information on the customer through the social media, which may result in a faster, more accurate, and less intrusive manner of obtaining such data versus asking the customer directly. In one embodiment, the social media module 1150 may be the Genesys Social Media Solution, available from Genesys.

The workload distribution module 1155 may be for distributing work tasks to the appropriate resources. Interactions between the customer and the contact center (through the automated agent) may create these work tasks. Some of these work tasks may be more appropriately handled by resources outside of the direct control of the automated agent (for example, the customer may request a live agent). Depending on factors such as the nature (e.g., severity, complexity, priority, business value, etc.) of the work task, the service level agreement (SLA) between the customer and the contact center, etc., the workload distribution module 1155 may assign the work task to a separate resource, such as a live agent or back office staff member. In one embodiment, the workload distribution module 1155 may be the iWD (intelligent Workload Distribution), available from Genesys.

The content analyzer module 1160 may be for analyzing the content of communications (for example, text-based communications) between the customer and the contact center, to increase the efficiency, accuracy, and consistency of text-based communications. By way of example, the content analyzer module 1160 may use natural language processing technology to analyze the text-based content and determine how to accurately process and/or respond to the communication. In one embodiment, the content analyzer module 1160 may be the eServices Content Analyzer, available from Genesys.

The speech recognition module 1165 may be for recognizing speech communicated to the contact center from the customer (through, for example, telephone or other voice-based communication devices) and converting the speech, for example, to corresponding words or text. The speech recognition module 1165 may use customer data (as obtained, for example, during voice recognition of the customer) to identify personal characteristics of the customer, such as the language being spoken by the customer, the dialect being spoken by the customer, and/or particular speech habits of the customer (as may be learned over time, for example, from interactions with the customer). In one embodiment, the speech recognition module 1165 may be the ASR (Automated Speech Recognition) component of the GVP (Genesys Voice Platform), available from Genesys.

The speech synthesis module 1170 may be for converting text to speech (for example, when returning communication from an automated agent to a customer that is receiving communication through a speech-based device, such as a telephone). In one embodiment, the speech synthesis module 1170 may be the TTS (Text-To-Speech) component of the GVP (Genesys Voice Platform), available from Genesys.

The enterprise integration module 1175 may be for customizing or integrating the automated agent with existing applications of the contact center for a particular enterprise. In one embodiment, the enterprise integration module 1175 may be the Genesys SDKs (Software Development Kits), available from Genesys. For example, the Genesys SDKs may be used for integrating the existing applications with Genesys FWK (Framework), GVP (Genesys Voice Platform), Genesys URS (Universal Routing Server), and Genesys Media Layer (all available from Genesys) in order for the automated agent to become the first respondent for customer interactions at the contact center for the enterprise as well as for connectivity between a central automated agent and two or more separate enterprise automated agents.

The artificial intelligence engine module 1180 may be tailored to the needs of the intelligent automated agent and be a source of intelligence for the intelligent automated agent. In one embodiment, the artificial intelligence engine module 1180 uses Petri nets or Petri net modules (for example, to build connections over time from learned behavior). The artificial intelligence engine module 1180 may learn from past interactions with customers to better handle future interactions with customers. In one embodiment, the artificial intelligence engine module 1180 may be configured to provide the automated agent particular traits or capabilities that would be suitable for use in a contact center. These traits or capabilities include deduction-reasoning-problem solving, knowledge representation and common-sense knowledge, planning, learning, natural language processing, perception, creativity, and suitable general intelligence for use in the contact center.

Figure 16:
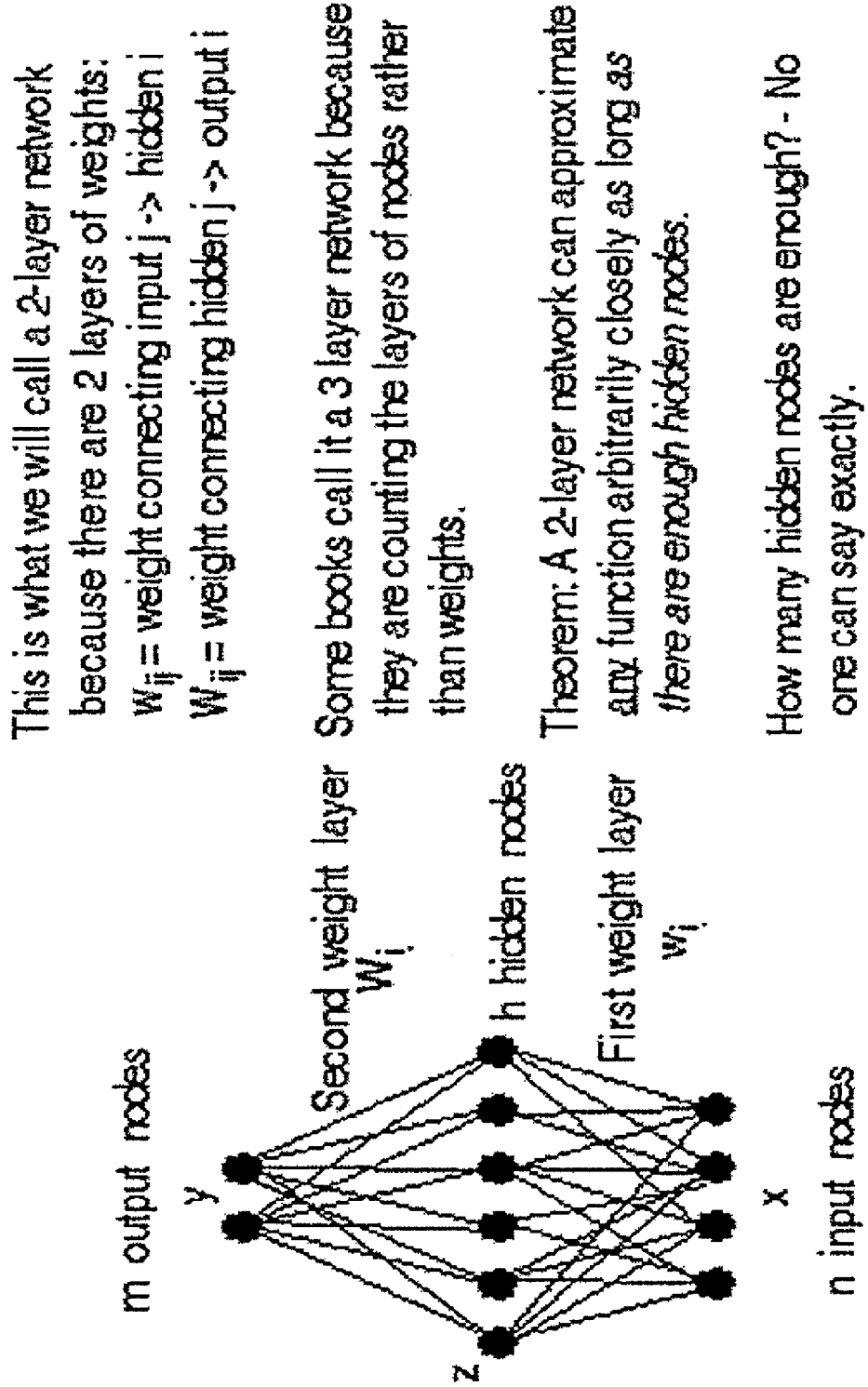
FIG. 16 illustrates an example neural network for an artificial intelligence engine of an intelligent automated agent according to one embodiment of the present invention.

In one embodiment, the artificial intelligence engine module 1180 may utilize the Petri net technology described in Kishinski et al., U.S. Pat. No. 6,178,239, "TELEPHONY CALL-CENTER SCRIPTING BY PETRI NET PRINCIPLES AND TECHNIQUES," the entire content of which is incorporated herein by reference, or may be done with other suitable Petri net technologies. FIG. 16 illustrates an example neural network for an artificial intelligence engine (such as artificial intelligence engine module 1180 of FIG. 14) of an intelligent automated agent according to one embodiment of the present invention. Neural networks may be modeled as Petri nets.

The artificial intelligence engine module 1180 is not limited to Petri net technologies. For example, in other embodiments, the artificial intelligence engine module 1180 may use learning capabilities such as feedback loop for quality of text categorization (such as for doing textual content analysis). In one embodiment, the feedback loop may use a suggested classification that can be approved or rejected/corrected, which can then be fed back into the classification engine to trigger further adjustment.

In one embodiment, the artificial intelligence engine module 1180 may be configured to learn a certain response in the context of the contact center by finding patterns in a stream of input to find a solution for a customer. In addition, the intelligent automated agent may be configured to learn through both classification and numerical regression. Classification is used to determine what category something belongs in, after seeing a number of examples of things from several categories. A form of classification is text categorization (or text classification, such as natural language text categorization), where text (such as e-mail, chat, web self service, speech recognition output, etc.) is categorized or classified into categories based on the content of the text (such as the number of times particular words or phrases may appear in the content).

Figure 17:
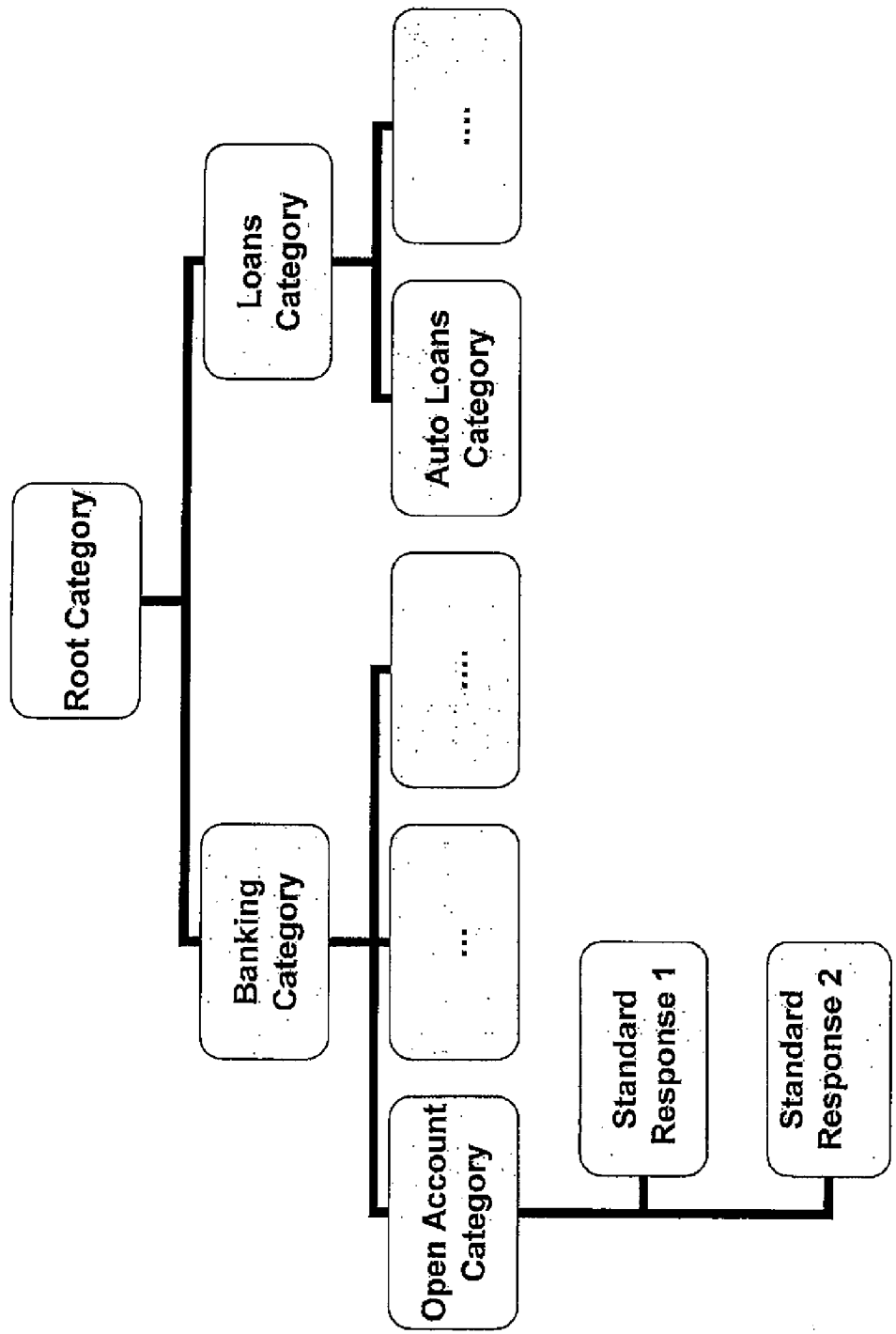
FIG. 17 illustrates an example category tree structure for a set of categories according to one embodiment of the present invention.

Generally speaking, the categories are fairly numerous, representing enough detail or specificity to enable, for example, the corresponding request to be routed to the appropriate resource, or for an intelligent automatic response to be generated, or for recommendations to be provided to a live agent handling the request. The categories, for example, may be organized in a tree-like structure (such as the category tree of FIG. 17). FIG. 17 illustrates a (somewhat simplified) example category tree structure for a set of categories for a banking institution. The various nodes (such as Root, Banking, Loans, Open Accounts, and Auto Loans) represent categories, with the leaves (e.g., Open Accounts and Auto Loans) being the most specific categories. For example, the leaves may represent the categories of possible requests, with various responses (such as Standard Response 1 and Standard Response 2 with the Open Accounts category) available for requests that fall into that category.

One goal of automatic text classification (as may be performed by the artificial intelligence engine module 1180) is be able to classify a new next T into its correct category C without live agent intervention. To this end, the artificial intelligence engine module 1180 may "learn" or "be trained" to perform the categorization by being provided text examples that belong to the category C and text examples that do not belong to the category C. The artificial intelligence engine module 1180 may then be presented with the question, "does the new text T belong to the category C?" In one embodiment, the artificial intelligence engine module 1180 may answer this question by breaking the text examples into words (for example, using lexical preprocessing and features extraction to obtains words or stems, such as word frequency). Features weighting and/or features selection may then be used to obtain vectors (using, for example, techniques such as information gain or chi-square).

Vectors, in turn, can be classified by various vector classification algorithms, including kNN (k-nearest neighbor), perceptron, decision trees and decision rules (such as decision tree learning), neural networks (which may be modeled as Petri nets), support vector machines, Bayes point (such as Bayes point machines), bagging/boosting paradigm (such as bootstrap aggregating), kernel methods (such as kernel paradigm).

Numerical regression, on the other hand is the attempt to produce a function that describes the relationship between inputs and outputs and predicts how the outputs should change as the inputs change. Moreover, the intelligent automated agent may be configured to learn through reinforcement learning in which the agent is rewarded for good responses and punished for bad ones. That is, every action by the intelligent automated agent is recorded by an intelligent recording system through a data base, and the recording system provides feedback in the form of rewards that guides the learning algorithm. In one embodiment, the intelligent automated agent may be configured to learn its own inductive bias based on previous experience.

In one embodiment, the intelligent automated agent may be configured as a part of an automated online assistant that uses artificial intelligence to provide customer service or other assistance on, for example, a website. Such an assistant, for example, may be composed of a dialog system, an avatar, and an expert system to provide specific expertise to the customer.

In one embodiment, the main function of the dialog system of the automated online assistant is to translate the human-generated input into a digital format that the automated online assistant may use for further processing by its expert system, as well as interpret whatever solutions or replies it generates back to what a human user understands, and optimally in a way as natural and user-friendly as possible. The dialog system may include a natural language processor. In addition, the dialog systems may have integrated chatterbots, giving them more or less an ability to engage in small talk or casual conversations unrelated to the scope of their expert systems, or to simply make the dialog feel more natural.

The avatar of an automated online assistant may be called an interactive online character or automated character. The avatar may make the automated online assistant into a form of an embodied agent. The avatar aims to enhance human-computer interaction by simulating real-world conversations and experience. Such an interaction model may be constructed to guide conversations in planned directions or allow characters to guide natural language exchanges. Because such characters may express social roles and emotions of real people, they may increase the trust that users place in online experiences. The level of interactiveness increases the perceived realism and effectiveness of such "actors," which translates into more prosperous on-line services and commerce.

An automated online assistant may also have an expert system that provides specific service, whose scope depends on the purpose of it. This system may be described as the intelligent automated agent that functions to perceive the needs of customers in order to perform proper reactions by various structured systems.

The avatar module 1190 may be for delivery of communications from the intelligent automated agent to the customer over a combination of voice and/or video channels. By way of example, the avatar (as implemented by the avatar module 1190) may be a computer-animated person for communicating with the customer over, for example, a smartphone or laptop computer via an app or web interface. In one embodiment, the avatar may be part of an enterprise intelligent automated agent. For example, the avatar may present a consistent interface between the enterprise and the customers. In one embodiment, the avatar may replace an IVR type interface (for example, when the automated customer greeting module 1110 is iCFD).

In one embodiment, the avatar for the enterprise is the same for all customers, while in another embodiment, the avatar may be customized by the enterprise and/or the customer. Depending on the customer communication channel being used (for example, smartphone, plain telephone, PDA, web, social media, instant messaging, etc.), the avatar may appear or be heard in visual and/or audio form. In one embodiment, the avatar module 1190 uses existing avatar technology for graphical rendering as would be available to one of ordinary skill in the art.

Figure 18:
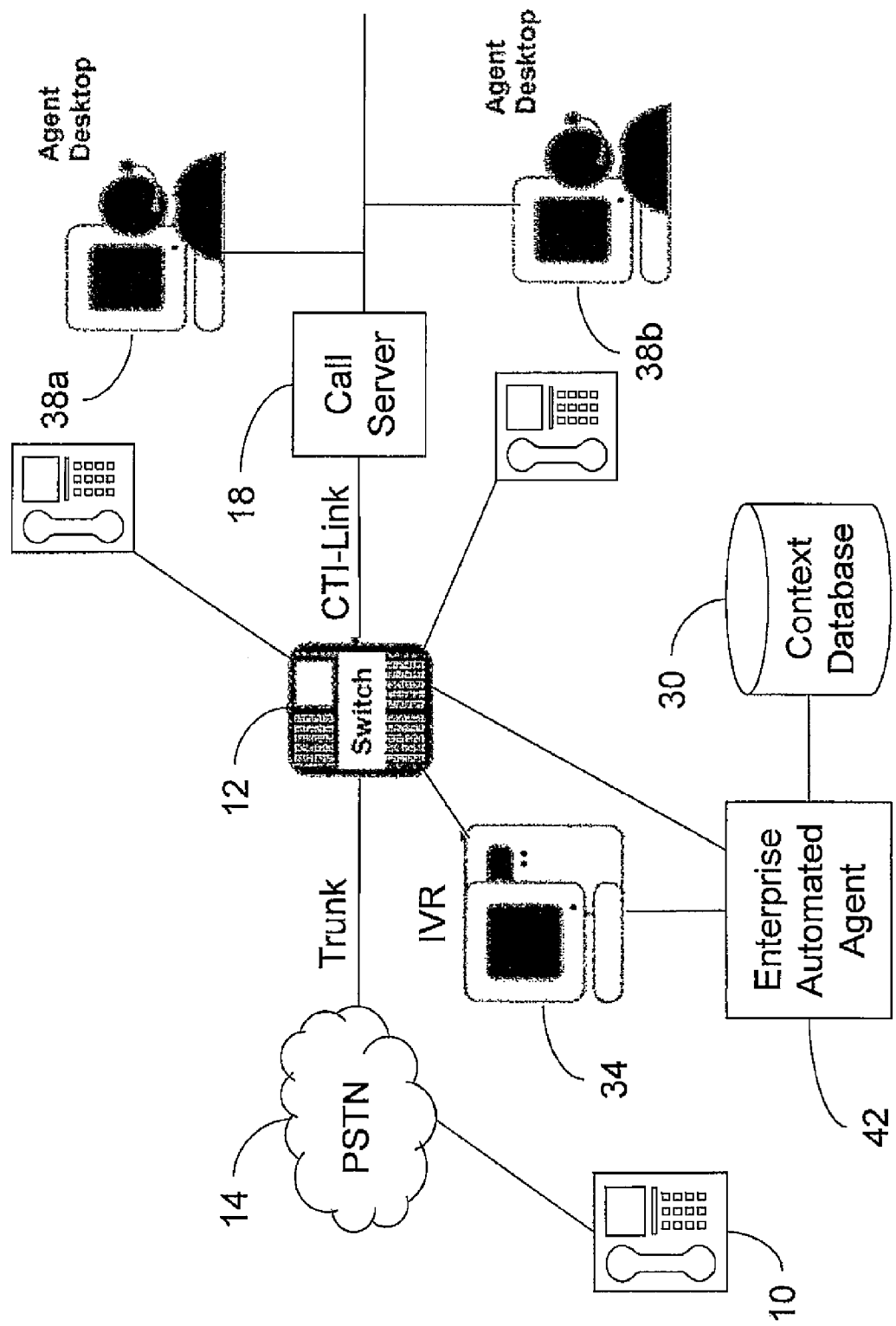
FIG. 18 is a schematic block diagram of a deployment of an automated agent within an enterprise contact center according to one embodiment of the present invention.

FIG. 18 is a schematic block diagram of a deployment of an automated agent within an enterprise contact center according to one embodiment of the present invention. Elements and components of the contact center of FIG. 18 may have similar numbers and descriptions to those of the contact center of FIG. 1, so may not be repeated. Enterprise automated agent 42 is coupled to a context database (stored on a nonvolatile storage device, such as a disk drive, cloud storage, or mass storage device 30). The context database 30 is for storing information, which may include personal information related to the customer such as customer profile data, for later retrieval by the enterprise automated agent 42. The context database 30 thus may provide context to the current interaction with the customer by providing data from previous interactions between the customer and the enterprise contact center that was collected and stored in the context database 30. An example use of the enterprise automated agent 42 will now be described with reference to FIG. 18.

A customer may contact the contact center, for example, by using customer phone 10 to initiate a voice interaction with the contact center. The customer call goes over PSTN 14 and then by trunk line to switch 12, which routes the call to IVR server 34. In this example use scenario, for instance, the enterprise may have an existing IVR server 34 that serves as the first point of contact of every outside customer call, and may route calls to the automated agent 42 in appropriate circumstances, such as at the customer's request. The IVR server 34 may obtain the identity of the customer (for example, by having the customer enter an identification code, such as an account number). The IVR server 34 may also ask the customer if they would like to be transferred to the automated agent 42.

When the customer requests the automated agent 42, the automated agent 42 may retrieve the customer profile data for the customer (using, for example, the identification code supplied by the customer to the IVR server) from the context database 30 and load the customer profile into dynamic memory (for example, on the server computer hosting the automated agent 42). The automated agent 42 may also request the switch 12 to connect the customer's call to the automated agent 42 instead of to the IVR server 34. The switch 12 responds by connecting the customer's call to the automated agent 42 for further handling. After the call, the automated agent 42 updates the customer profile in the context database 30 with the information obtained from the just-completed interaction with the customer.

From this point, the automated agent 42 interacts with the customer based, for example, on its artificial intelligence engine, the customer profile data for the customer already loaded into its dynamic memory, and the customer's current behavior and responses. As a result, the automated agent 42 may provide far more personalized customer service than possible with the IVR server 34 or even a live agent 38. In addition, the customer service continues to become more personalized with further interactions between the customer and the automated agent 42 (from, for example, the refining artificial intelligence engine and the building customer profile that comes from more interactions and contact time between the automated agent 42 and the customer) or between the customer and other aspects of the contact center (such as live agents, IVR server, back office, web, mobile, etc.), which also insert relevant data into the customer profile (and thus into the context database 30, allowing the automated agent 42 to continue learning about the customer even in the absence of direct interaction).

The automated agent 42 is thus aware of and learning from or building upon all interactions between the customer and the contact center, becoming more personalized over time with each succeeding interaction between the customer and the contact center. By contrast, the IVR server 34 tends to maintain constant customer service over time while most live agents 38 may show only a small improvement in personalization. For example, large contact centers may route the same customer among several live agents over time (because of factors such as the work schedule of the live agents, their job duration, the availability of live agents at any particular moment in time, etc.), and live agents' ability to remember much of the personal details of the customer diminishes with the large number of interactions they have with other customers between interactions with the same customer.

Figure 19:
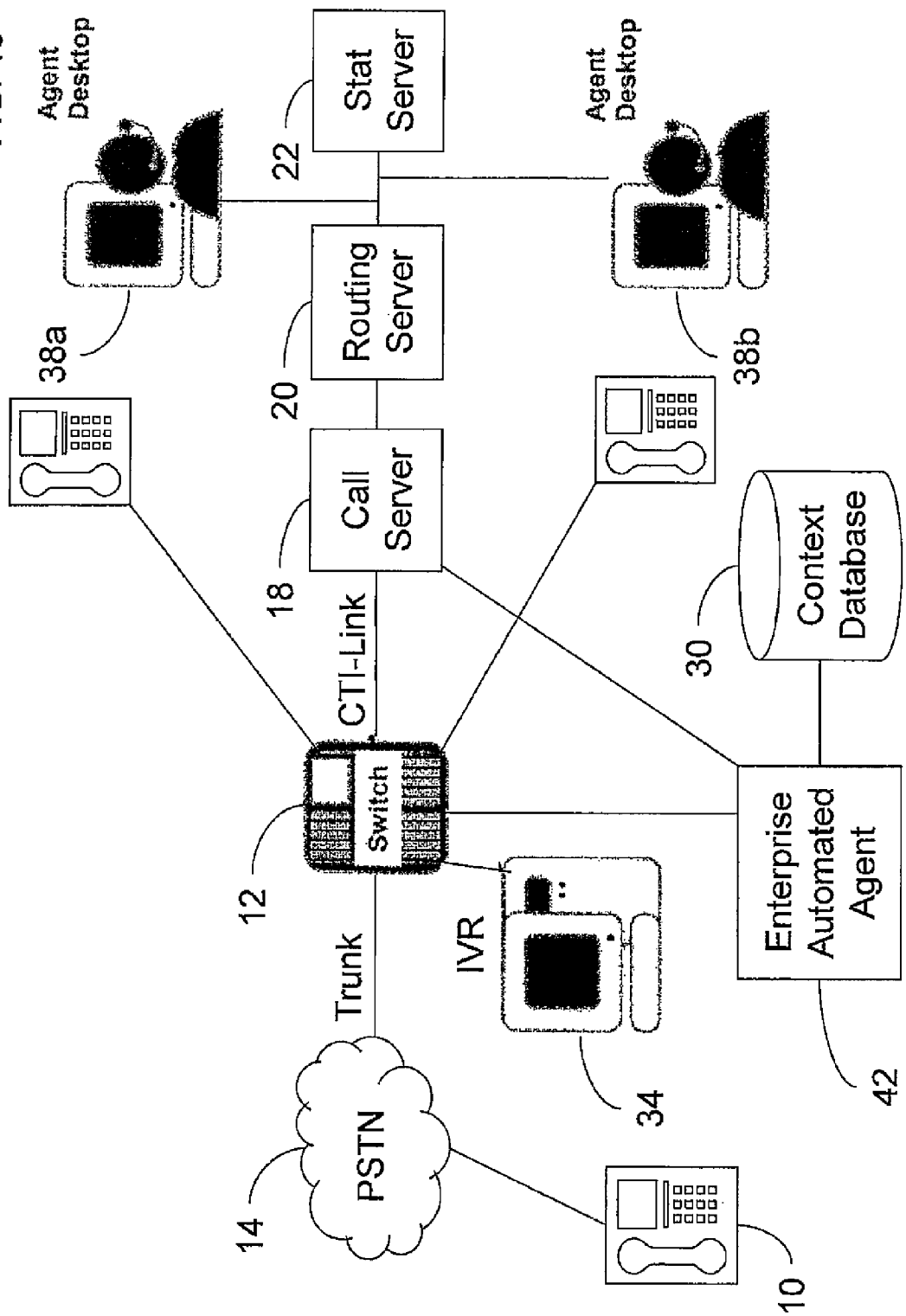
FIG. 19 is a schematic block diagram of another deployment of an automated agent within an enterprise contact center according to one embodiment of the present invention.

FIG. 19 is a schematic block diagram of another deployment of an automated agent within an enterprise contact center according to one embodiment of the present invention. Elements and components of the contact center of FIG. 19 may have similar numbers and descriptions to those of the contact center of FIG. 18 and FIG. 1, so may not be repeated. In the contact center of FIG. 19, routing server 20 may route calls from call server 18 to live agents 38*a* or 38*b*, while stat server 22 may monitor activity of live agents 38*a* and 38*b* (and whether either live agent is available for another incoming call). An example use of the enterprise automated agent 42 will now be described with reference to FIG. 19.

A customer may contact the contact center, for example, by using customer phone 10 to initiate a voice interaction with the contact center. The customer call goes over PSTN 14 and then by trunk line to switch 12, which routes the call to IVR server 34. In this example use scenario, for instance, the enterprise may attempt to transfer all incoming calls to live agents (when available). Accordingly, after the IVR server 34 obtains the identity of the customer (for example, as in the example use scenario in FIG. 18), control of the call may pass to the call server 18 for connection to a live agent (such as live agent 38*a* or 38*b*). The call server 18 in turn may attempt to route the call to a live agent by making a request to the routing server 20. Upon receiving this request, the routing server 20 may consult the stat server 22 to see if any live agents are currently available. If the stat server 22 responds back to the routing server 20 that no live agents are currently available, the routing server 20 may decide (for example, based on the enterprise contact center's policy or strategy) that the call should be routed to the automated agent 42 (versus, for example, putting the customer on hold for what may be a lengthy period of time).

Accordingly, in this example use scenario of FIG. 19, the routing server 20 ultimately responds back to the call server 18 to transfer the call to the automated agent 42. The call server 18 may then send any collected user information (such as the identity of the caller) to the automated agent 42 and may notify the switch 12 to route the call to the automated agent 42. With the received user information, the automated agent 42 may retrieve the customer profile data for the customer (e.g., as in with FIG. 18 above) from the context database 30 and load the customer profile into dynamic memory (for example, on the server computer hosting the automated agent 42). The switch 12 may then connect the customer's call to the automated agent 42. The automated agent 42 then services the customer call (for example, to the call's resolution). After the call, the automated agent 42 updates the customer profile in the context database 30 with the information obtained from the just-completed interaction with the customer.

The example use scenario of FIG. 19 is thus an example of using the automated agent 42 as a substitute agent, such as for help in overflow situations when the contact center's live agent staff is being fully utilized. To this end, while the automated agent 42 is at times described above as a single entity, as one of ordinary skill in the art would appreciate, the automated agent 42 may be implemented as a series of tasks on one or more computers (such as server computers), and these tasks replicated and run concurrently to create the effect of multiple automated agents 42. These multiple automated agents 42 may all share the context database 30. The contact center could then provide sufficient automated agents 42 by providing sufficient computing resources (for example, enough server computers or increased processing capability within each server computer) as would be apparent to one of ordinary skill in the art.

Figure 20:
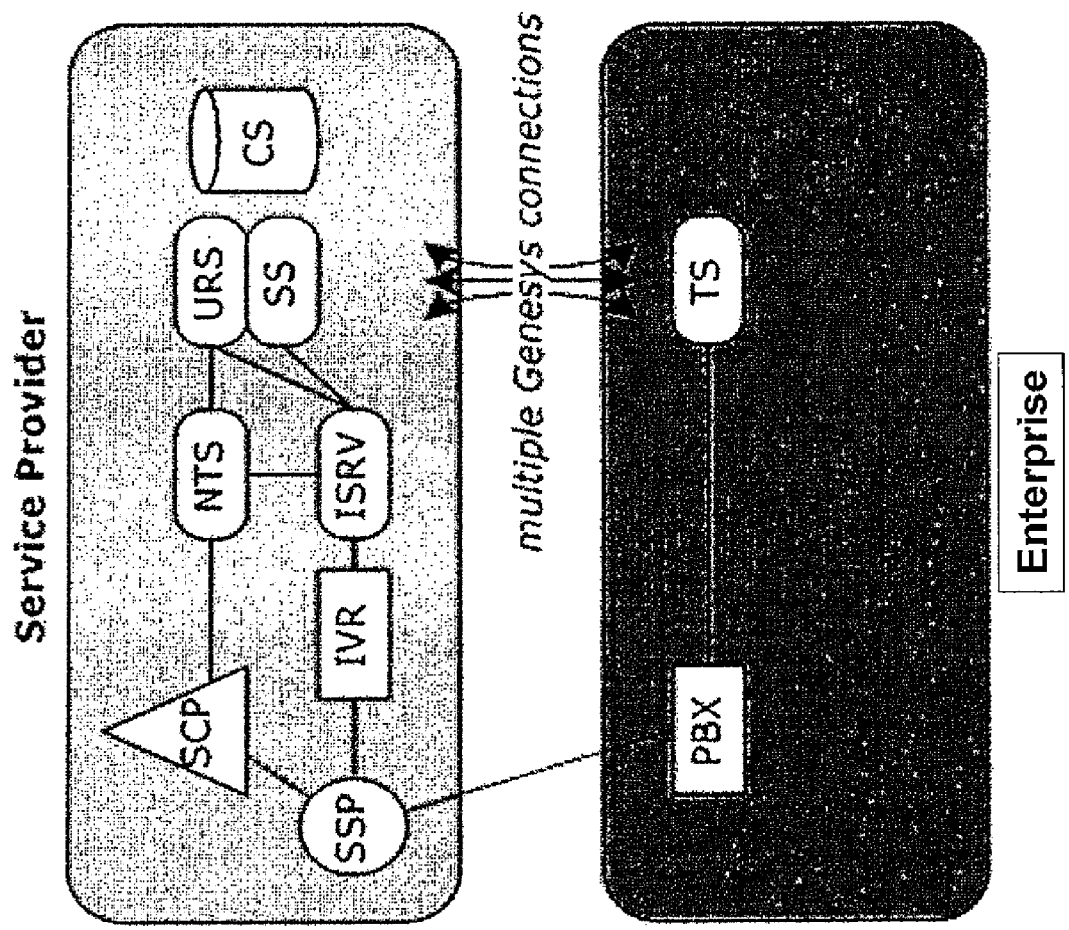
FIG. 20 is a schematic block diagram of an exemplary network IVR platform according to one embodiment of the present invention.

FIG. 20 is a schematic block diagram of an exemplary network IVR platform according to one embodiment of the present invention. In FIG. 20, a customer places a call to the contact center of an Enterprise (which is provided by a Service Provider). The call may be routed from telephone TS to the contact center of the Enterprise (a provided by the Service Provider) through a privately-owned switch of the Enterprise, such as private branch exchange PBX. From there, the call may be routed by a telephone network to the Service Provider (for example, a service provided providing contact center services to the Enterprise), where it may be received by a service switching point (SSP).

In the network IVR platform of FIG. 20, the SSP may transfer the call to either the service control point (SCP) or the IVR server. Depending on qualification factors (such as the phone number dialed), the call may be routed to the IVR server for IVR handling of the call. The IVR server may communicate with the rest of the contact center via the I Server ISRV. For example, the IVR server may find a live agent to route the call to by making a request to the (universal) routing server URS. The I Server may also be connected to a Network T Server NTS and a statistics server SS.

In addition to transferring the call to the SCP directly (for example, for calls that do not qualify for IVR handling), the IVR server may direct an incoming call to a particular live agent (such as a live agent selected by the routing server URS after possibly consulting the statistics server SS) in the network IVR platform of FIG. 20 using, for example, a two-step process. First, the call is rerouted at the SSP to the SCP. Then the SCP connects the call to the particular live agent within the contact center. This is a more direct and less resource consuming approach to redirecting the current call than, say, routing the call through (e.g., tromboning on) the IVR.

Figure 21:
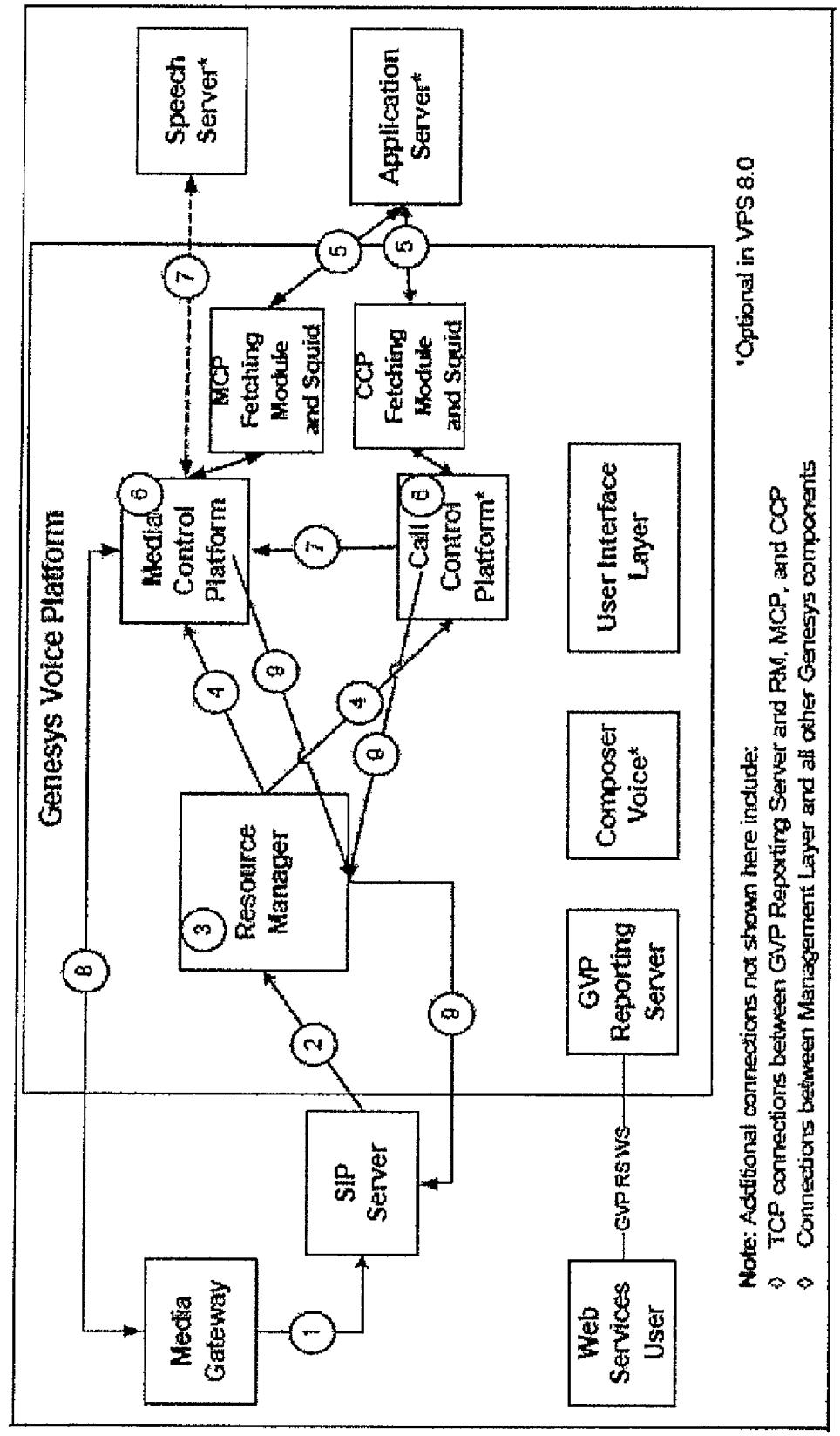
FIG. 21 is a schematic block diagram of an exemplary voice platform for processing of inbound calls according to one embodiment of the present invention.

FIG. 21 is a schematic block diagram of an exemplary voice platform for processing of inbound calls according to an exemplary embodiment of the present invention. For example, some of the components illustrated in FIG. 21 are part of the Genesys Voice Platform, available from Genesys. The handling of an inbound call is illustrated in FIG. 21.

The handling of the inbound call is illustrated as a series of 9 numbered steps:

1. A call comes in to the Session Initiation Protocol (SIP) Server from an external source through a third-party media gateway.
2. The SIP Server passes the call to the GVP Resource Manager (SIP INVITE).
3. The Resource Manager determines what to do with the call. If the Resource Manager accepts the call, it matches the call to an Interactive Voice Response (IVR) Profile and selects a resource.
4. The Resource Manager sends the call to a Media Control Platform or Call Control Platform resource (SIP INVITE). When it forwards requests to resources, the Resource Manager inserts additional SIP headers or parameters, as required by the service prerequisites, service parameters, and policies that have been configured for the IVR Profile.
5. The Fetching Module for that Media Control Platform or Call Control Platform resource fetches the required Voice Extensible Markup Language (VoiceXML) or Call Control XML (CCXML) page from the application server (file, Hypertext Transfer Protocol (HTTP), or Secure HTTP (HTTPS) request).
6. The VoiceXML Interpreter (Next Generation Interpreter [NGI] or GVP Interpreter [GVPi]) on the Media Control Platform or CCXML Interpreter (CCXMLI) on the Call Control Platform interprets the page and executes the application (VoiceXML or CCXML).
7. Depending on the application, the Media Control Platform or Call Control Platform requests (through the Resource Manager) and uses additional services:
   a. For automatic speech recognition (ASR) or text-to-speech (TTS) services, the Media Control Platform communicates with the third-party speech application server by using Media Resource Control Protocol (MRCPv1 or MRCPv2).
   b. If the Call Control Platform requires conference or audio play/record services, it obtains them from a Media Control Platform resource. The Media Control Platform or Call Control Platform sends all requests for services from other GVP components through the Resource Manager (SIP or Network Announcement [NETANN]).
8. The Real-time Transport Protocol (RTP) media path is established between the Media Control Platform and the SIP end user—in this example, the originating caller through the media gateway.
9. The Resource Manager ends the call when one of the parties (the SIP end user, the Media Control Platform, or the Call Control Platform) disconnects, or when the call is transferred out of GVP (SIP BYE or REFER).

Figure 22:
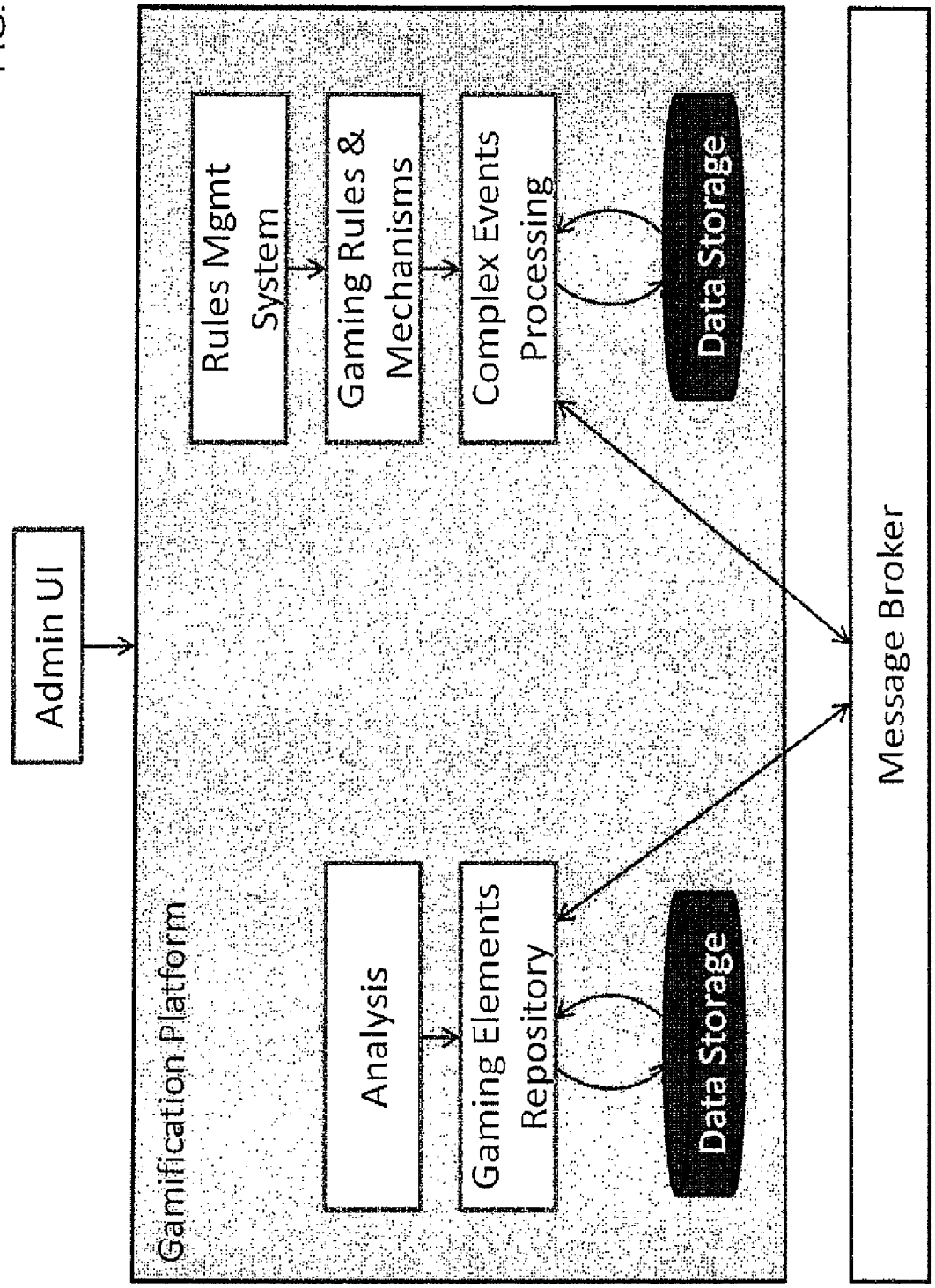
FIG. 22 is a schematic block diagram of an exemplary gamification service module of an intelligent automated agent according to one embodiment of the present invention.

FIG. 22 is a schematic block diagram of an exemplary gamification service module of an intelligent automated agent according to an exemplary embodiment of the present invention. FIG. 22 illustrates an example gamification architecture, including an administration user interface (Admin UI), a gamification platform, and a message broker. The gamification platform breaks down into two separate processing threads: an analysis and gaming elements thread on the left, and an rules and complex events thread on the right. Both threads interact with a corresponding data storage to carry out their respective processing.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for providing back office services for a contact center to a customer through an intelligent automated agent, the method comprising:

running the intelligent automated agent on a processor coupled to a non-transitory storage device;

accessing a profile of the customer from a customer profile database stored on the storage device, the profile of the customer comprising interaction data from interactions involving the customer and the contact center, and analysis results from analyzing the interaction data between the interactions involving the customer and the contact center, wherein the analysis results comprises a list of pending transactions and/or requests by the customer that are not yet completed;

generating new analysis results by performing the analyzing of the interaction data between consecutive interactions of the interactions involving the customer and the contact center;

classifying customers of the contact center into different classifications based on their corresponding analysis results of the profiles of the customers;

generating corresponding new analysis results by performing the analyzing of respective interaction data of the profiles of the customers using different analysis criteria for the different classifications;

updating the analysis results of the profile of the customer on the storage device to reflect the new analysis results;

re-accessing the profile of the customer during a next interaction of the interactions involving the customer and the contact center;

determining, based on the re-accessed profile of the customer, whether the next interaction is to be handled by the automated agent or a live agent, wherein the determining includes determining, based on the profile of the customer, as to whether there are cross-sale or up-sale opportunities;

detecting customer mood;

selecting the live agent amongst a plurality of agents based on the detected customer mood;

forwarding the next interaction to the live agent instead of the automated agent in response to determining that cross-sale or up-sale opportunities exist;

in response to the determining that the next interaction is to be handled by the automated agent:

adjusting a behavior of the automated agent during the next interaction by factoring in the analysis results of the re-accessed profile of the customer, wherein the adjusting of the behavior includes deleting or altering an output of the automated agent based on the analysis results of the re-accessed profile of the customer; and updating the interaction data of the re-accessed profile on the storage device to reflect the next interaction; and addressing the pending transactions and/or requests during future interactions of the interactions involving the customer and the contact center.

2. The method of claim 1, wherein
the analysis results comprise actions to be taken by the automated agent during future interactions of the interactions involving the customer and the contact center, and
the method further comprises performing the actions by the automated agent during the future interactions.

3. The method of claim 1, further comprising:
generating additional analysis results between the consecutive interactions by re-analyzing the interaction data using newer analysis criteria since the updating of the analysis results of the profile of the customer to reflect the new analysis results; and
updating the analysis results of the profile of the customer on the storage device to reflect the additional analysis results.

4. The method of claim 1, further comprising assigning an appropriate live agent from a pool of live agents to the customer based on the analysis results of the profile of the customer.

5. The method of claim 1, further comprising deleting or altering suggested responses to the customer based on the analysis results of the profile of the customer.

6. A system for a contact center comprising:
a processor;
a non-transitory storage device configured to store customer profile data; and
a memory, wherein the memory has instructions stored thereon that, when executed by the processor, causes the processor to:
  access a profile of the customer from a customer profile database stored on the storage device, the profile of the customer comprising interaction data from interactions involving the customer and the contact center, and analysis results from analyzing the interaction data between the interactions involving the customer and the contact center, wherein the analysis results comprises a list of pending transactions and/or requests by the customer that are not yet completed;
  generate new analysis results by performing the analyzing of the interaction data between consecutive interactions of the interactions involving the customer and the contact center;
  classify customers of the contact center into different classifications based on their corresponding analysis results of the profiles of the customers;
  generate corresponding new analysis results by performing the analyzing of respective interaction data of the profiles of the customers using different analysis criteria for the different classifications;
  update the analysis results of the profile of the customer on the storage device to reflect the new analysis results;
  re-access the profile of the customer during a next interaction of the interactions involving the customer and the contact center;
  determine, based on the profile of the customer, whether the next interaction is to be handled by an automated agent or a live agent, wherein the instructions that cause the processor to determine include instructions that cause the processor to determine, based on the profile of the customer, as to whether there are cross-sale or up-sale opportunities;
  detect customer mood;
  select the live agent amongst a plurality of agents based on the detected customer mood;
  forward the next interaction to the live agent instead of the automated agent in response to determining that cross-sale or up-sale opportunities exist;
  in response to the determining that the next interaction is to be handled by the automated agent:
    adjust a behavior of the automated agent during the next interaction by factoring in the analysis results of the re-accessed profile of the customer, wherein the adjusting of the behavior includes deleting or altering an output of the automated agent based on the analysis results of the re-accessed profile of the customer; and
    update the interaction data of the re-accessed profile on the storage device to reflect the next interaction; and
  address the pending transactions and/or requests during future interactions of the interactions involving the customer and the contact center.

7. The system of claim 6, wherein
the analysis results comprise actions to be taken by the automated agent during future interactions of the interactions involving the customer and the contact center, and
the instructions, when executed by the processor, further cause the processor to perform the actions during the future interactions.

8. The system of claim 6, wherein the instructions, when executed by the processor, further cause the processor to:
generate additional analysis results between the consecutive interactions by re-analyzing the interaction data using newer analysis criteria since the updating of the analysis results of the profile of the customer to reflect the new analysis results; and
update the analysis results of the profile of the customer on the storage device to reflect the additional analysis results.

9. The system of claim 6, wherein the instructions, when executed by the processor, further cause the processor to:
classify customers of the contact center into different classifications based on their corresponding analysis results of the profiles of the customers; and
generate corresponding new analysis results by performing the analyzing of respective interaction data of the profiles of the customers using different analysis criteria for the different classifications.

10. The system of claim 6, wherein
the analysis results comprises a list of pending transactions and/or requests by the customer that are not yet completed, and
the instructions, when executed by the processor, further cause the processor to address the pending transactions and/or requests during future interactions of the interactions involving the customer and the contact center.

11. The method of claim 1 further comprising selecting the live agent amongst a plurality of agents based on a search of agents with skills for handling both a primary need of the customer, and the cross-sale or up-sale to the customer.

12. The method of claim 11 further comprising selecting the live agent amongst the plurality of agents based on a search of agents who fit the profile of the customer.

* * * * *